United States Patent
Propst

(10) Patent No.: US 7,984,594 B1
(45) Date of Patent: Jul. 26, 2011

(54) COMPOSITE BUILDING AND PANEL SYSTEMS

(75) Inventor: John Eugene Propst, Phoenix, AZ (US)

(73) Assignee: Propst Family Limited Partnership, LLC, Phoenix, AZ (US)

( * ) Notice: Subject to any disclaimer, the term of this patent is extended or adjusted under 35 U.S.C. 154(b) by 0 days.

(21) Appl. No.: 12/844,163

(22) Filed: Jul. 27, 2010

Related U.S. Application Data

(60) Provisional application No. 61/296,616, filed on Jan. 20, 2010.

(51) Int. Cl.
*E04C 1/41* (2006.01)
*E04B 2/00* (2006.01)

(52) U.S. Cl. ......... 52/309.12; 52/309.7; 442/42; 442/45

(58) Field of Classification Search ......... 52/293.1–294, 52/309.7, 309.12; 442/20, 29, 42, 45
See application file for complete search history.

(56) References Cited

U.S. PATENT DOCUMENTS

| | | | | |
|---|---|---|---|---|
| 1,681,311 A | * | 8/1928 | Techmer | 52/238.1 |
| 1,693,742 A | * | 12/1928 | Bemis | 52/238.1 |
| 2,091,552 A | * | 8/1937 | Macauley | 52/293.2 |
| 2,902,853 A | * | 9/1959 | Lofstrom | 52/286 |
| 3,492,196 A | * | 1/1970 | Moore | 442/326 |
| 4,049,874 A | * | 9/1977 | Aoyama et al. | 428/451 |
| 4,113,913 A | * | 9/1978 | Smiley | 428/312.4 |
| 4,186,536 A | * | 2/1980 | Piazza | 52/309.12 |
| 4,349,398 A | * | 9/1982 | Kearns et al. | 156/71 |
| 4,525,965 A | * | 7/1985 | Woelfel | 52/309.17 |
| 4,646,498 A | * | 3/1987 | Schneller et al. | 52/309.12 |
| 4,653,243 A | * | 3/1987 | Burkett | 52/741.4 |
| 4,774,794 A | * | 10/1988 | Grieb | 52/309.7 |
| 4,852,316 A | * | 8/1989 | Webb | 52/235 |
| 4,876,151 A | * | 10/1989 | Eichen | 428/446 |
| 4,882,888 A | * | 11/1989 | Moore | 52/309.9 |
| 5,410,852 A | * | 5/1995 | Edgar et al. | 52/408 |
| 5,758,461 A | * | 6/1998 | McManus | 52/293.3 |
| 5,758,463 A | * | 6/1998 | Mancini, Jr. | 52/309.12 |
| 5,826,388 A | * | 10/1998 | Irving | 52/302.1 |

(Continued)

OTHER PUBLICATIONS

Wind-Lock, Wind-Devil 2 Fastening System, [online]. 1 page. [retrieved on Jan. 6, 2010]. Retrieved from the Internet: <URL: http://www.wind-lock.com/cat-25-1-5/Fasteners.htm, Leesport, PA>.

(Continued)

*Primary Examiner* — Robert Canfield
(74) *Attorney, Agent, or Firm* — Schmeiser, Olsen & Watts LLP

(57) ABSTRACT

A building panel structure is disclosed, in which composite building panels are used to form a structure. A composite building panel is disclosed which includes a core and a coating applied over the core. In some embodiments the core consists of a frame and one or more than one insulating structural block. The insulating structural blocks can be encapsulated polystyrene (EPS) foam blocks. In some embodiments the coating includes an inner scratch layer and an outer main brown layer. The inner scratch layer can be formed of at least two layers. The outer main brown layer can include a fiberglass mesh embedded into the outer main brown layer. A method of forming a building panel structure is disclosed which includes forming a core using a frame and one or more than one block, applying an inner scratch layer to the core, and applying an outer main brown layer over the inner scratch layer.

7 Claims, 21 Drawing Sheets

U.S. PATENT DOCUMENTS

| | | | | |
|---|---|---|---|---|
| 5,966,885 | A * | 10/1999 | Chatelain | 52/309.4 |
| 5,979,131 | A * | 11/1999 | Remmele et al. | 52/309.9 |
| 6,044,603 | A * | 4/2000 | Bader | 52/309.7 |
| 6,112,489 | A * | 9/2000 | Zweig | 52/405.1 |
| 6,745,531 | B1 * | 6/2004 | Egan | 52/302.1 |
| 6,918,218 | B2 * | 7/2005 | Greenway | 52/267 |
| 6,931,809 | B1 * | 8/2005 | Brown et al. | 52/409 |
| 7,194,845 | B2 * | 3/2007 | Belleau | 52/745.09 |
| 2004/0043682 | A1 * | 3/2004 | Taylor et al. | 442/42 |
| 2008/0257222 | A1 * | 10/2008 | Wallner | 106/689 |
| 2009/0239430 | A1 * | 9/2009 | Egan et al. | 442/46 |
| 2010/0307091 | A1 * | 12/2010 | Diaz et al. | 52/309.13 |

OTHER PUBLICATIONS

Dryvit Systems, Inc., [online]. 1 page [retrieved on Jan. 6, 2010]. Retrieved from the Internet: <URL: What are Dryvit Outsulation Systems, http://www.dryvit.com/systems.asp?country_id=1, West Warwick, RI>.

* cited by examiner

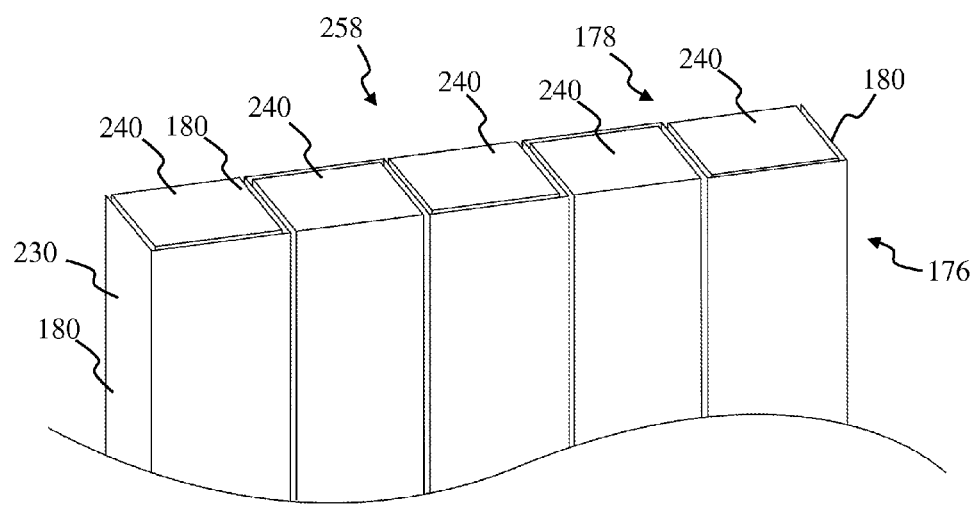
FIG. 17
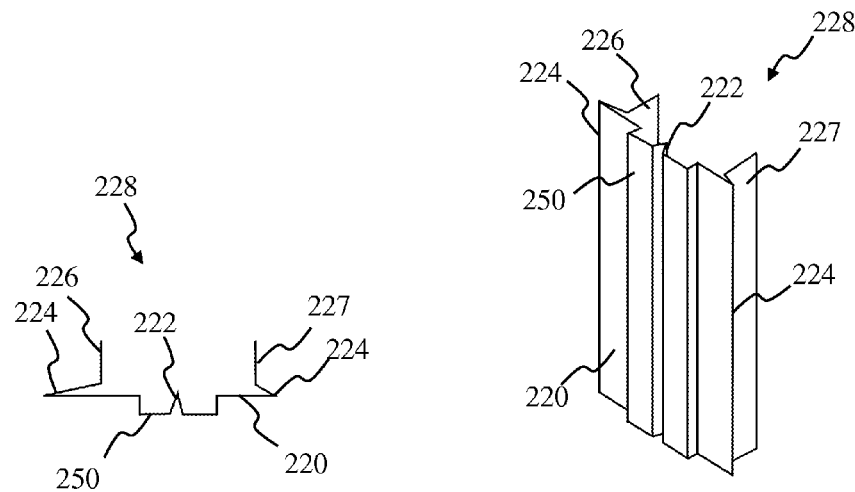 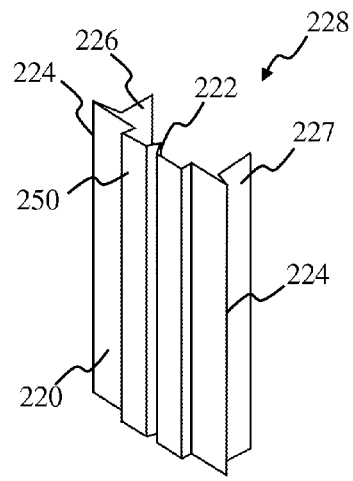
FIG. 18    FIG. 19

COMPOSITE BUILDING AND PANEL SYSTEMS

CROSS REFERENCE TO RELATED APPLICATION

This application claims priority to U.S. Provisional Patent Application to John Propst entitled "Layered Building Panel System," Ser. No. 61/296,616, filed Jan. 20, 2010, the disclosure of which is hereby incorporated entirely herein by reference.

BACKGROUND OF THE INVENTION

1. Technical Field

This invention relates generally to materials for constructing buildings and structures and more specifically to composite building panels.

2. State of the Art

Buildings have historically been constructed of brick, cement block, wood frame and, more recently, steel frame and stucco. The material and techniques used in constructing buildings is evolving in an effort to reduce cost, increase energy efficiency, reduce the amount of wood usage in buildings, and to reduce material waste. Cement block and brick construction requires a large amount of manpower to create a building, which raises the cost of the building. Wood has long been a staple material in building construction, but recently there is a desire to preserve forest resources. Wood is inherently more susceptible to damage from inclement weather, moisture, mold, fire, and insect infestation. Also, when wood is used to create a building there can be a large amount of waste. This is because standard sized boards are sent to the construction site, which must be cut and assembled at the building site into a building. The labor involved in cutting lumber to size results in high labor costs and a large amount of lumber wasted from boards cut to size.

It is also desirable to increase the energy efficiency of buildings in order to reduce the energy costs during the lifetime of the building. Cement block, brick, and wood frame and stucco construction do not provide the high level of energy efficiency that can be obtained from newer materials.

Foam blocks have become a popular alternative and are environmentally sustainable as compared to traditional wood, cement block, and brick construction materials. Foam block systems are lightweight, can be molded or formed into any needed shape, result in a thermally efficient building construction, and require less skilled manpower to form into a building structure. Other benefits include, but are not limited to, a resistance to moisture, mold, fire and insect damage. The foam blocks are constructed using materials which are recyclable and renewable, provide good insulating qualities, and are often themselves made from recycled materials. Alternatively, construction blocks can also be made from other environmentally friendly materials such as straw, wood fibers, paper, and glass, for example.

One problem with some of the new building materials such as foam block is that the structural strength of a building element such as a wall may not be as high as when wood, brick or cement block are used to form the building element. This can be particularly important in areas where buildings are required to withstand high winds or earthquakes. There is a need for a prefabricated building panel system which minimizes construction time, uses environmentally friendly materials, and results in a building panel with high structural strength and structural integrity.

DISCLOSURE OF THE INVENTION

This invention relates generally to materials for constructing buildings and structures and more specifically to composite building panels. Disclosed is a composite building panel comprising a core and a coating covering a portion of the core. The core includes a front surface, a rear surface, and one or more than one side. The coating includes an inner scratch layer and an outer main brown layer. The outer main brown layer includes cement, aggregate, acrylic bonder, fiberglass strands, and fiberglass mesh. In some embodiments the scratch layer consists of at least two layers. In some embodiments the scratch layer includes a first scratch layer A of cement, aggregate, and acrylic bonder, and a second scratch layer B which includes cement, aggregate, acrylic bonder, fiberglass strands, and fiberglass mesh. In some embodiments the inner scratch layer includes a wire mesh. In some embodiments the outer main brown layer aggregate includes perlite. In some embodiments the outer main brown layer aggregate includes sand. In some embodiments the core includes a frame and one or more than one insulating structural block coupled to the frame. In some embodiments the insulating structural block is composed of expanded polystyrene foam. In some embodiments the frame is embedded in the one or more than one insulating structural block. In some embodiments the building panel includes a control joint.

A composite building panel structure is disclosed which includes a composite building panel with a building panel groove, and a footer with an integral footer tongue. The building panel groove is coupled to the footer tongue to create a composite building panel structure. In some embodiments the footer and the footer tongue are both formed of concrete. In some embodiments the building panel includes a core and a coating covering a portion of the core. In some embodiments the core has a front surface, a rear surface and one or more than one sides. In some embodiments the building panel structure includes a track coupled to the core, where the track comprises a base portion covering a portion of a side, and a rain drain channel formed in the base portion. In some embodiments the track further comprises a seal spacer channel. In some embodiments the track comprises a screed boundary. In some embodiments the core includes a frame and one or more than one insulating structural block coupled to the frame. In some embodiments the coating includes an inner scratch layer and an outer main brown layer. The inner scratch layer in some embodiments includes a first scratch layer A of cement, aggregate, and acrylic bonder, and a second scratch layer B of cement, aggregate, acrylic bonder, fiberglass strands, and fiberglass mesh. The outer main brown layer includes cement, aggregate, acrylic bonder, fiberglass strands, and fiberglass mesh.

A building panel is disclosed which includes a core with a front surface, a rear surface, and one or more than one side; and a track coupled to the core. The track includes a base portion which covers a portion of the edge, and a rain drain channel formed in the base portion. In some embodiments the track further comprises a seal spacer channel. In some embodiments the track further comprises a screed boundary. In some embodiments the track further comprises a first and a second opposing arm extending from the base, where the first and second opposing arm frictionably engage the front surface and the rear surface, respectively, of the core.

A method of forming a building panel structure is disclosed including forming a core using a frame and one or more than one insulating structural block, applying an inner scratch layer to a portion of the core, and applying an outer main brown layer over the inner scratch layer. The outer main brown layer is made of cement, aggregate, acrylic bonder, fiberglass strands, and fiberglass mesh. In some embodiments forming a core using a frame and one or more than one insulating structural block means embedding the frame within the one or more than one insulating structural block.

In some embodiments applying an inner scratch layer to a portion of the core includes additional steps. In some embodiments applying an inner scratch layer to a portion of the core includes creating a first scratch layer A mixture comprising cement, aggregate, acrylic bonder, and water. In some embodiments applying an inner scratch layer to a portion of the core includes blowing the first scratch layer A onto a portion of the core. In some embodiments applying an inner scratch layer to a portion of the core includes allowing the first scratch layer A to cure. In some embodiments applying an inner scratch layer to a portion of the core includes creating a second scratch layer B brown mixture comprising cement, aggregate, acrylic bonder, fiberglass strands, and water. In some embodiments applying an inner scratch layer to a portion of the core includes trowelling the second scratch layer B brown mixture over the first scratch layer A. In some embodiments applying an inner scratch layer to a portion of the core includes embedding a fiberglass mesh in the second scratch layer B brown mixture while the second scratch layer B brown mixture is still wet. In some embodiments applying an inner scratch layer to a portion of the core includes allowing the second scratch layer B brown mixture to cure.

In some embodiments applying an outer main brown layer over the inner scratch layer includes additional steps. In some embodiments applying an outer main brown layer over the inner scratch layer includes creating a main brown layer brown mixture comprising cement, aggregate, acrylic bonder, fiberglass strands, and water. In some embodiments applying an outer main brown layer over the inner scratch layer includes trowelling the main brown layer brown mixture over the inner scratch layer. In some embodiments applying an outer main brown layer over the inner scratch layer includes embedding a fiberglass mesh in the main brown layer brown mixture while the main brown layer brown mixture is still wet. In some embodiments applying an outer main brown layer over the inner scratch layer includes allowing the main brown layer brown mixture to cure. In some embodiments the main brown layer brown mixture aggregate includes 20 grit sand and 30 grit sand. In some embodiments the main brown layer brown mixture aggregate include perlite. In some embodiments the main brown layer brown mixture aggregate includes vermiculite.

In some embodiments applying an inner scratch layer further includes embedding a wire mesh in the inner scratch layer. In some embodiments the method of forming a building panel structure further includes pouring a footer with an integral footer tongue, and coupling the core to the footer tongue, wherein the core includes a building panel groove.

A method of forming a structure is disclosed which includes forming a building panel, coupling a track to the building panel, where the track includes a rain drain channel, and interconnecting multiple building panels to create a structure. In some embodiments forming a building panel includes forming a core with a frame and one or more than one insulating structural block, and applying a coating to a portion of the core. In some embodiments applying a coating to a portion of the core includes applying an inner scratch layer to a portion of the core. In some embodiments applying an inner scratch layer to a portion of the core includes applying an inner scratch layer A onto a portion of the core, and applying an outer scratch layer B over the inner scratch layer A. In some embodiments the inner scratch layer A includes cement, aggregate, and acrylic bonder. In some embodiments the outer scratch layer B includes cement, aggregate, acrylic bonder, fiberglass strands, and fiberglass mesh. In some embodiments applying an inner scratch layer further includes embedding a wire mesh in the inner scratch layer. In some embodiments applying a coating to a portion of the core includes applying an outer main brown layer to a portion of the core, where the outer main brown layer includes cement, aggregate, acrylic bonder, fiberglass strands, and fiberglass mesh. In some embodiments the method of forming a structure includes coupling a track to a footer. In some embodiments interconnecting multiple building panels includes coupling a first building panel track to a second building panel track.

The foregoing and other features and advantages of the present invention will be apparent from the following more detailed description of the particular embodiments of the invention, and as illustrated in the accompanying drawings.

BRIEF DESCRIPTION OF THE DRAWINGS

FIG. 17 is a perspective view of core 258 of building panel 212 of FIG. 16.

FIG. 18 is an end view of track 228 used with building panel 212 of FIG. 16.

FIG. 19 is a perspective view of track 228 used with building panel 212 of FIG. 16.

DETAILED DESCRIPTION OF EMBODIMENTS OF THE INVENTION

As discussed above, embodiments of the present invention relate to material used in constructing buildings and more specifically to composite building panels and composite building panel structures.

The use of environmentally friendly, insulating, lightweight block materials for use as the walls, roofs, floors and other structures in buildings is increasing in popularity. The blocks of material are being used to replace concrete blocks and insulated wood and stucco walls. These blocks are structural elements which provide insulation properties and a shaped mass which defines the shape of the structure to be built. Expanded polystyrene (EPS) foam blocks are a popular material, but other materials such as straw, plastic, and recycled elements are also being used to create insulating structural blocks. These new building materials use less wood, decrease construction waste, often use recycled materials, and create a building which is more energy efficient than standard wood frame and plaster construction buildings. Insulating structural blocks such as EPS foam blocks are often lightweight and can be molded or shaped easily to create any desired shape. These new block materials, including EPS foam blocks, sometimes do not posses the necessary structural strength for specific building structures. In these cases it is necessary to add structural elements to the building panels made from insulating structural block materials. Disclosed herein are composite building panels and methods of creating composite building panels using insulating structural blocks, frames, and coatings over the blocks and frames to create structurally strong structures and building panels, while still retaining the lightweight, environmentally friendly, and energy efficient characteristics of the insulating structural blocks.

Figure 1:
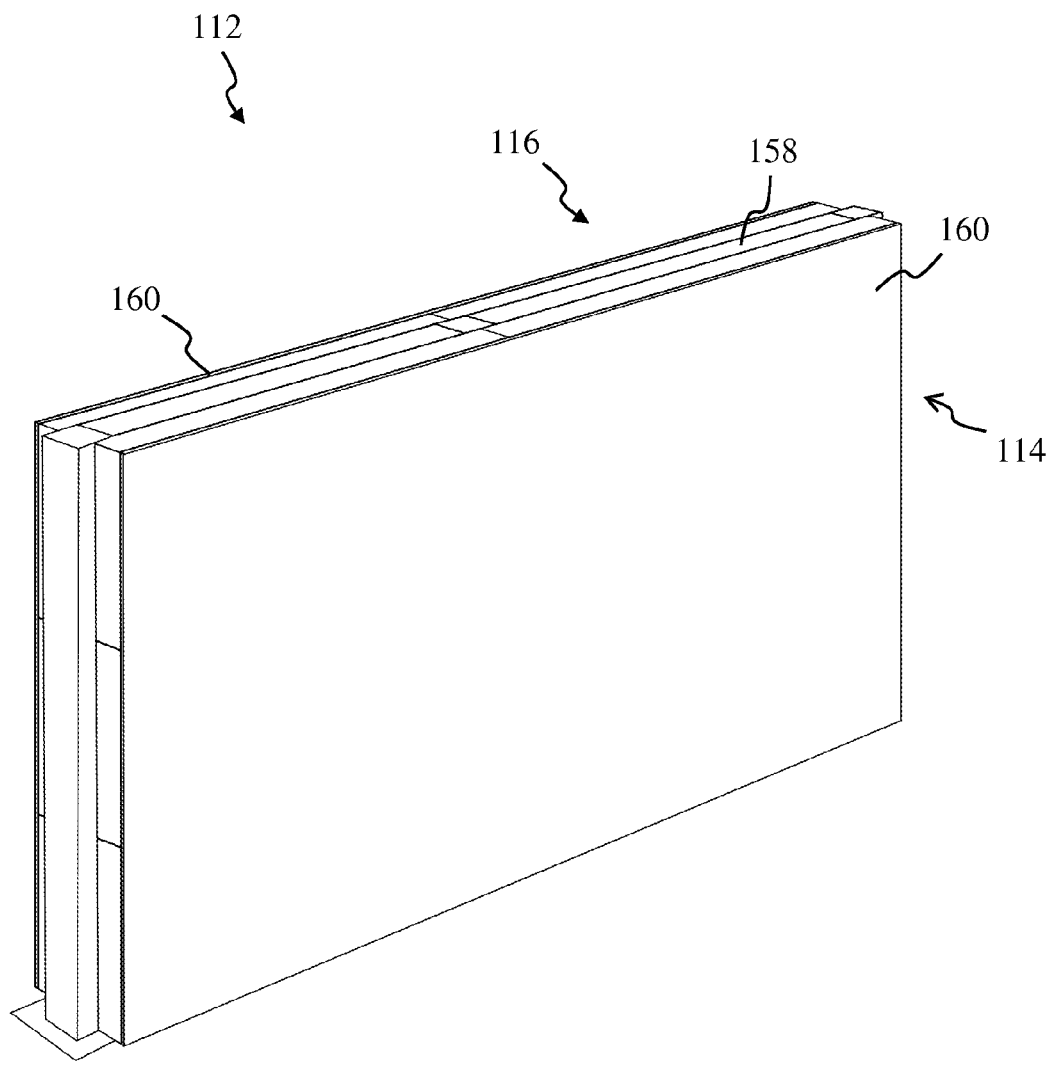
FIG. 1 is a perspective view of one embodiment of composite building panel 112 according to the invention.

FIG. 1 shows a perspective view of one embodiment of a composite building panel according to the invention. A composite building panel means a building panel (a building element) formed of multiple components, which is used in constructing a form, structure, building, or edifice. Composite building panel 112 is shown including core 158 and coating 160 covering a portion of core 158. Composite building panel 112 is used to form walls, floors, ceilings, beams, or other elements used in creating a structure, edifice, or building.

Composite building panel (also referred to as building panel or just panel) 112 is shown in FIG. 1 as having a rectangular shape for use as a wall or block fence structure, for example. Building panel 112 can be formed in any size and shape according to the needs of the structure to be built. In some embodiments building panel 112 is square, or rectangular or round, or oval, oblong or elongated. Building panel 112 can be curved, or part curved and part rectangular. Building panel 112 can take any shape. Building panel 112 takes a shape according to the shape of the structure to be built. Core 158 forms the basic shape, and coating 160 covers a portion of core 158 to add strength to building panel 112, to form an impermeable layer on a portion of core 158, and/or to provide an aesthetically pleasing surface for exterior finishing. Building panel 112 has first surface 114 which includes coating 160, and second surface 116 which includes coating 160. Coating 160 will be discussed in detail shortly.

Figure 2:
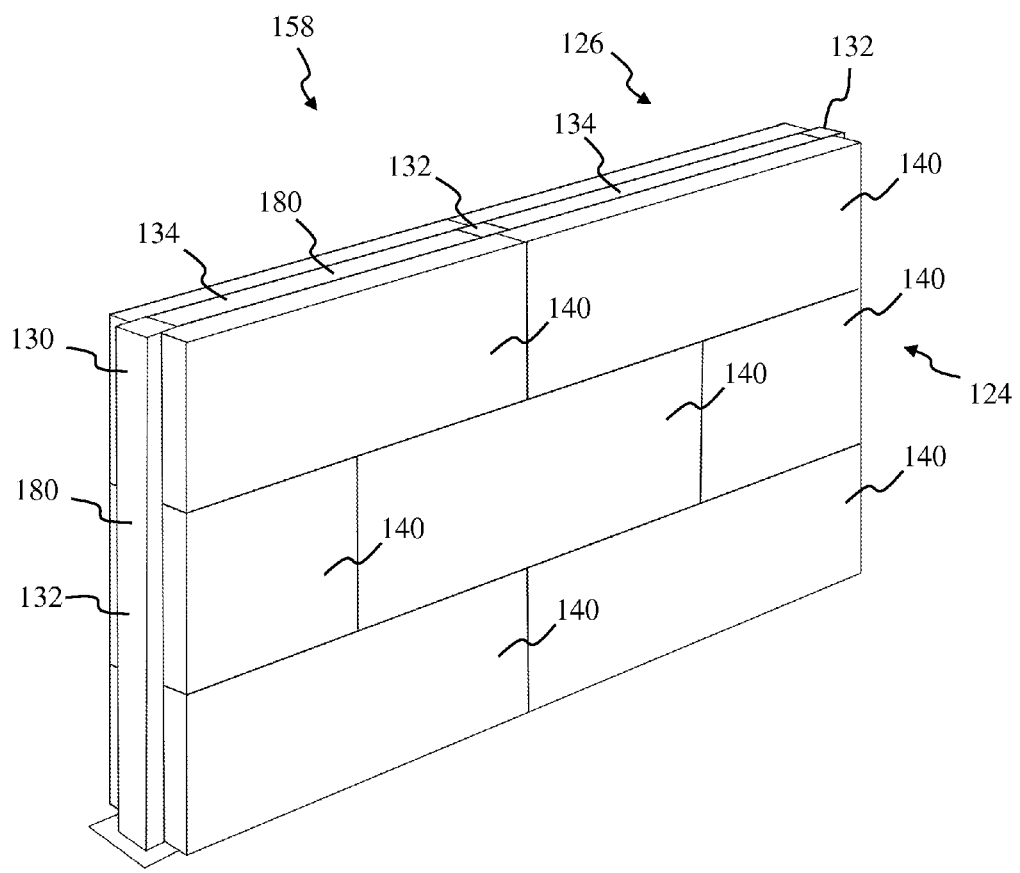
FIG. 2 is a perspective view of core 158 of building panel 112 of FIG. 1.
Figure 3:
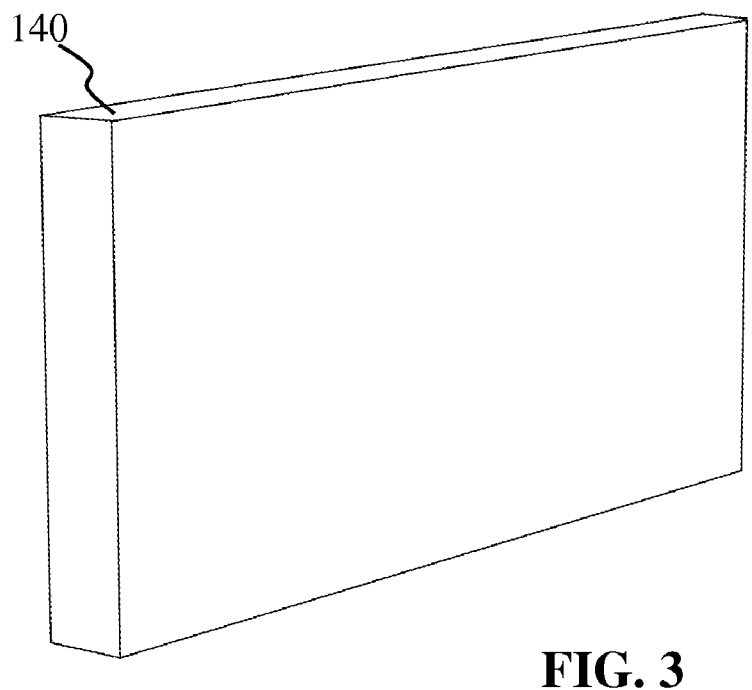
FIG. 3 is a perspective view of one embodiment of insulating structural block 140 that can be used with building panel 112 according to the invention.
Figure 4:
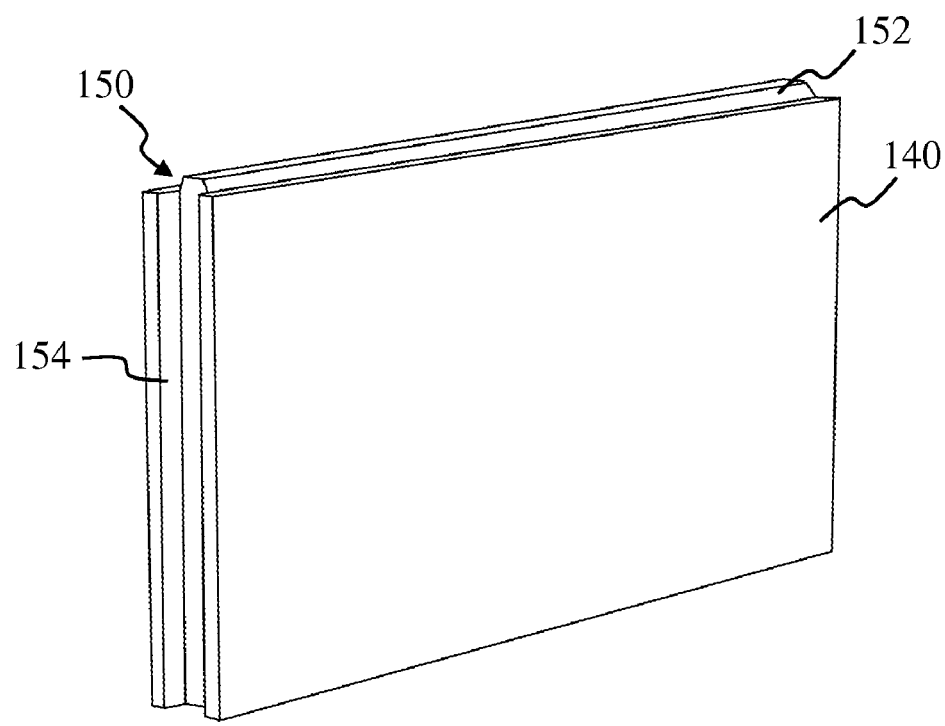
FIG. 4 is a perspective view of another embodiment of insulating structural block 140 that can be used with building panel 112 according to the invention, with insulating structural block 140 of FIG. 4 having interlocking features 150.
Figure 5:
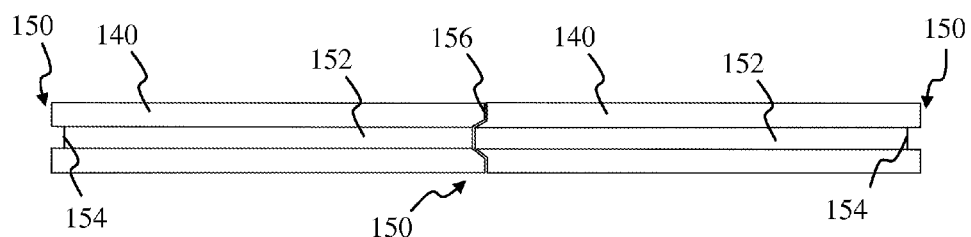
FIG. 5 is a top view of two interlocked insulating structural blocks 140 of building panel 112 of FIG. 1, with insulating structural blocks 140 having interlocking features 150.

FIG. 2 is a perspective view of core 158 of building panel 112 of FIG. 1. Building panel 112 is formed of core 158 and coating 160, where coating 160 covers a portion of core 158. Core 158 has front surface 124, rear surface 126, and multiple sides 180 (two of four sides 180 shown) as shown in FIG. 2. Coating 160 according to the invention covers at least a portion of front surface 124 or rear surface 126 of core 158. In this embodiment coating 160 covers both front surface 124 and rear surface 126. Core 158 is formed in this embodiment of frame 130 and one or more than one insulating structural block 140, as shown in FIG. 2 through FIG. 5. In this embodiment core 158 includes more than one insulating structural block 140. In some embodiments core 158 includes one insulating structural block 140. FIG. 3 is a perspective view of an insulating structural block 140 that can be used in building panel 112 according to the invention. FIG. 4 is a perspective view of another insulating structural block 140 that can be used in composite building panel 112 according to the invention. In FIG. 4 insulating structural block 140 includes interlock elements 150. Interlock elements 150 are used to interlock multiple insulating structural blocks 140 to each other and to interlock insulating structural blocks 140 to frame 130. FIG. 5 is a top view of two interlocked insulating structural blocks 140 of building panel 112 of FIG. 1, with interlocking features 150 which interlock insulating structural blocks 140 and frame 130 as detailed in FIG. 6 through FIG. 8.

In some embodiments of building panel 112 core 158 is made solely of insulating structural blocks 140. In some embodiments core 158 is made of insulating structural blocks 140 and frame 130, as shown in FIG. 2. In some embodiments core 158 is made of other elements besides insulating structural blocks 140 and frame 130. Core 158 can be formed of any material or materials that provide the necessary building-shaped elements and that accepts coating 160 to create building panel 112 according to the invention. Insulating structural blocks are also referred to in this document as simply "blocks".

Frame 130 in this embodiment creates the skeletal structure for the walls, floors, ceiling, beams, or other building elements that are needed to form a structure using building panel 112. Frame 130 in the embodiment shown in FIG. 2 includes vertical members 132 and horizontal members 134. In this embodiment frame 130 is formed of galvanized steel. Frame 130 according to the invention can be made of other structural material such as wood, aluminum, other metals, plastic, etc. In this embodiment frame 130 is formed from 4"×4"×3/16" galvanized steel box tubing. Horizontal members 134 and vertical members 132 are coupled in a manner which holds the members together solidly. In some embodiments mechanical attachments such as bolts are used. In some embodiments the members of frame 130 are welded together. In some embodiments the individual members of frame 130 connect together at angles other than horizontal and vertical. Diagonal frame members are used in some embodiments of frame 130. In some embodiments frame 230 includes metal straps running diagonally. It is to be understood that frame 130 according to the invention can take many different shapes and sizes according to the specifics of the structure to be built. Frame 130 can be formed of many different materials according to the structural strength needed by the structure to be built.

Frame 130 in this embodiment is embedded in insulating structural blocks 140. Frame 130 being embedded in blocks 140 means that the majority of frame 130 is encased in blocks 140, with a minimum of surface area of frame 130 not covered by blocks 140. Frame 130 is embedded in insulating structural blocks 140 by cutting blocks 140 into shapes that will encircle and couple to frame 130. Having frame 130 embedded in insulating structural blocks 140 provides several advantages for building panel 112. Frame 130 being embedded in blocks 140 provides structural strength to core 158 and yet leaves most of the outer surface of core 158 as a surface of blocks 140, so that the outer surface of core 158 can be easily shaped and covered with coating 160. This allows core 158 and building panel 112 to be shaped for aesthetically pleasing shapes, and provides a surface which accepts and retains coating 160 for strength and exterior finishing. In this embodiment, where frame 130 is embedded in blocks 140, there are portions of frame 130 which are not covered by block 140 so that frame 130 can be connected to other frames and structures, but the majority of frame 130 is embedded in blocks 140. In other embodiments of building panel 112 frame 130 is not embedded in blocks 130, meaning that significant portions of frame 130 are on the exterior surface of core 158. Some of these embodiments will be discussed later in this document.

Insulating structural blocks 140 have several purposes, including defining the shape of the building panel 112 being created, providing insulating properties, and providing a surface for applying coating 160 or other coatings or layers. Insulating structural blocks 140 in core 158 of FIG. 2 are used to enclose frame 130 elements and to form the desired shape of the structure to be built with building panel 112. Some embodiments of insulating structural blocks 140 according to the invention are shown in FIG. 3, FIG. 4 and FIG. 5. Blocks 140 are often formed to interlock with each other and with frame 130 as shown in FIG. 2, FIG. 4, and FIG. 5. In this embodiment insulating structural blocks 140 according to the invention are made of expanded polystyrene (EPS) foam, creating an EPS foam insulating structural block 140. EPS foam blocks provide high energy efficiency and are lightweight. EPS foam can be created from recycled materials and can itself be recycled. Another desirable feature of EPS foam block 140 is that it can be easily molded or cut into any desired shape. FIG. 4 and FIG. 5 shows EPS foam insulating structural blocks 140 that have been cut to include interlock elements 150, where interlock elements 150 in this embodiment include tongue 152 and groove 154. Blocks 140 can be made into any shape, size, and structure according to the structure being built using building panel 112. In this embodiment insulating structural blocks 140 are 4'×8'×6" EPS foam insulating structural blocks, which have interlocking elements 150 cut into them so that they interlock with themselves and with frame 130 to create core 158 as shown in FIG. 2. In this embodiment one pound density EPS foam is used but any suitable material and density can be used according to the invention which provides suitable structural characteristics. Blocks 140 are connected to each other and to concrete in this embodiment using a polymer-based acrylic adhesive 156 such as Primus sold by Dryvit Systems Inc. (Dryvit). Blocks 140 are coupled to metal or wood in this embodiment using a water-based acrylic copolymer adhesive such as Adhesive for EPS (ADEPS) from Dryvit. In some embodiments insulating structural blocks 140 and frame 130 are coupled to other members and to each other using different adhesives, glues, mechanical attachments, or other suitable coupling means.

In this embodiment insulating structural block 140 is made of EPS foam. Insulating structural block 140 according to invention can be made of other materials, including but not limited to straw, wood, plastic, paper, or recycled materials.

In the embodiment of core 158 of FIG. 2, insulating structural block 140 is cut to shape from the rectangular EPS foam blocks 140 as shown in FIG. 3 to create the shaped insulating structural blocks 140 as shown in FIG. 4. Cutouts and interlocking elements are cut from blocks 140 to create a block 140 shape that will enclose frame 130, interlock with other blocks 140 and frame 130, and provide a surface of the desired shape for the structure to be built. Blocks 140 according to the invention can be molded to shape or formed to the correct size and shape using methods such as slicing, melting, or other block-shaping methods. Block 140 can be formed to any size and shape needed to create the structure being formed, such as walls, floors, roofs, ceilings, beams, fences, bridges, edifices, offices, etc. Blocks 140 and frame 130 can be formed into any size and shape to create core 158 and building panel 112 in any size and shape to form the desired structure.

Openings and passageways for utilities, air flow, or other types of access through building panel 112 can be easily cut into core 158 as desired. Openings for windows and doors can be formed in core 158.

Figure 7:
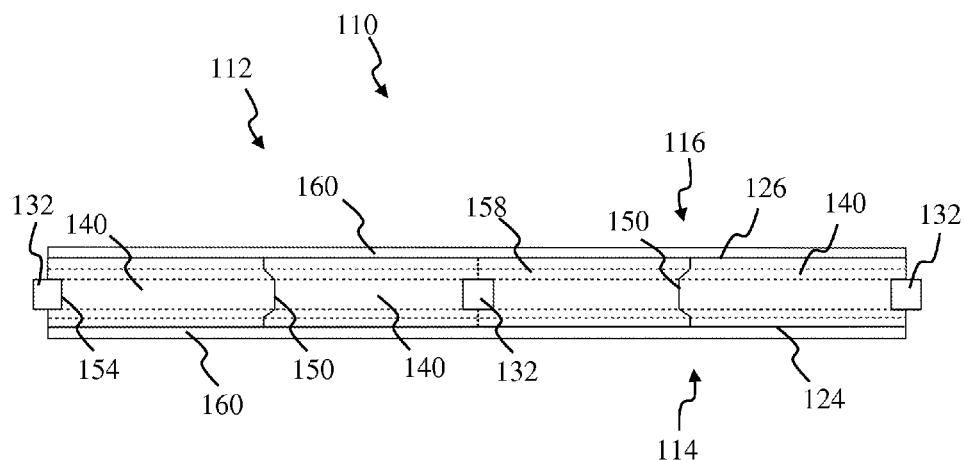
FIG. 7 shows horizontal cross-section 7-7 of building panel 112 of FIG. 6.
Figure 6:
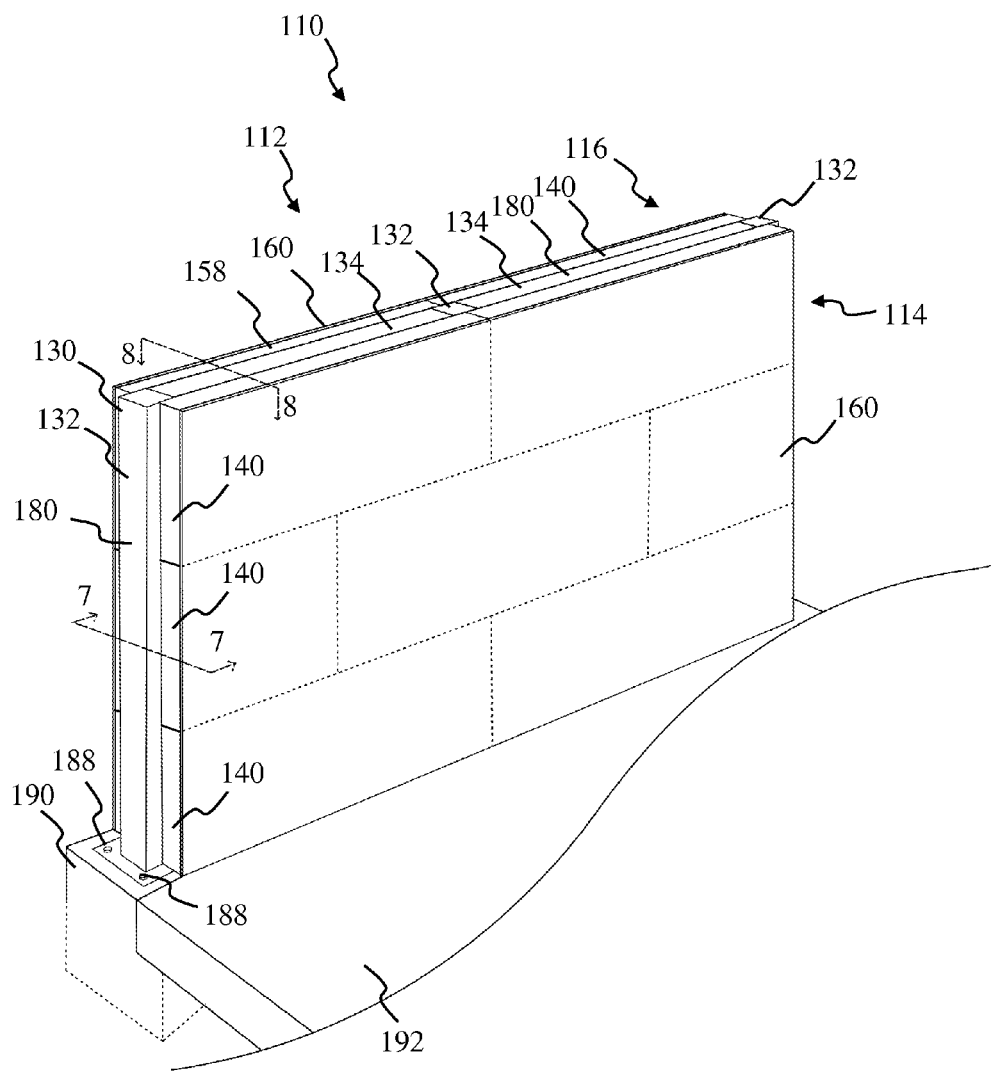
FIG. 6 shows a perspective view of core 158 with coating 160 applied, creating building panel 112 of building panel structure 110 according to the invention.
Figure 8:
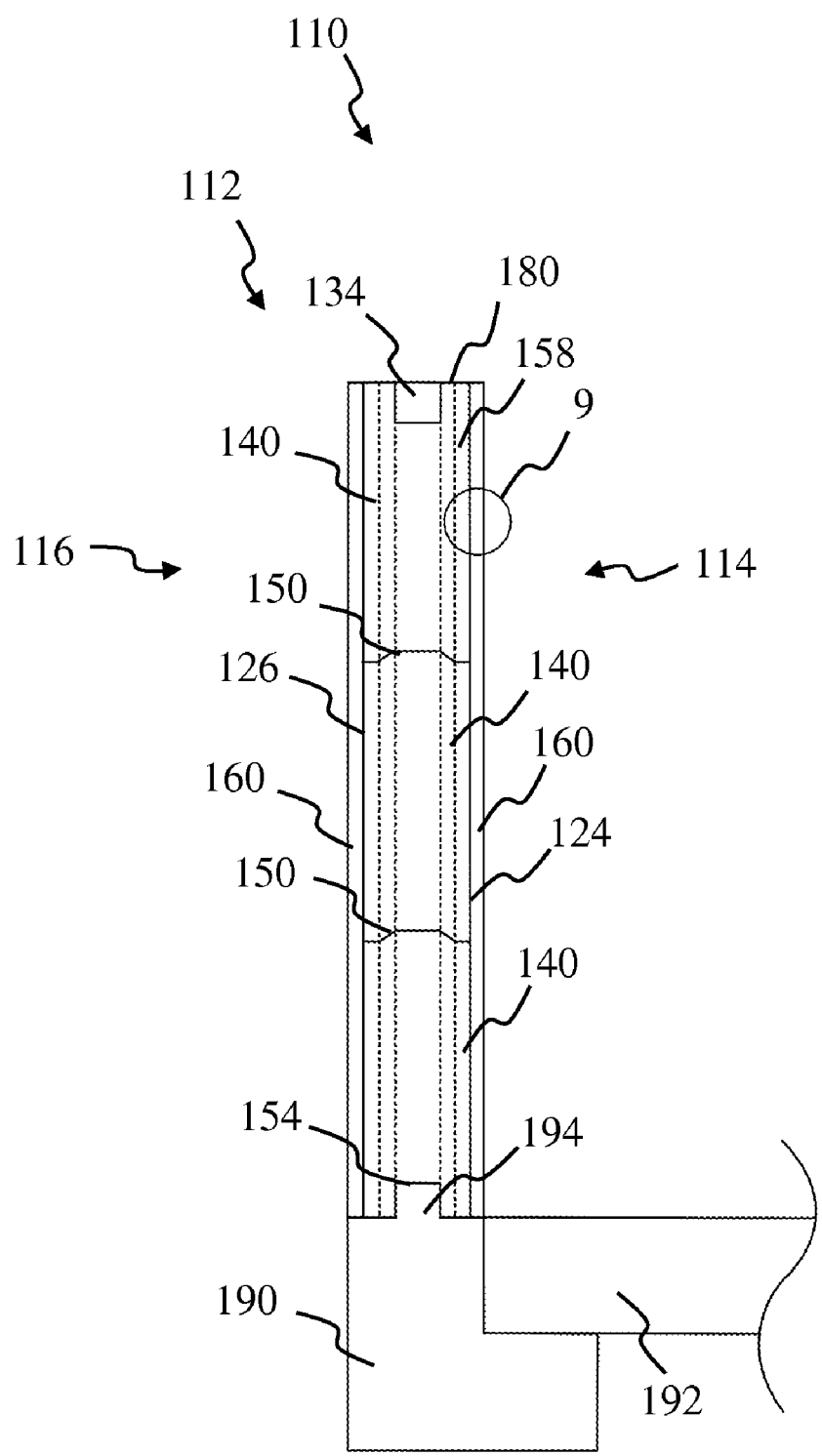
FIG. 8 shows vertical cross-section 8-8 of building panel 112 of FIG. 6.
Figure 9:
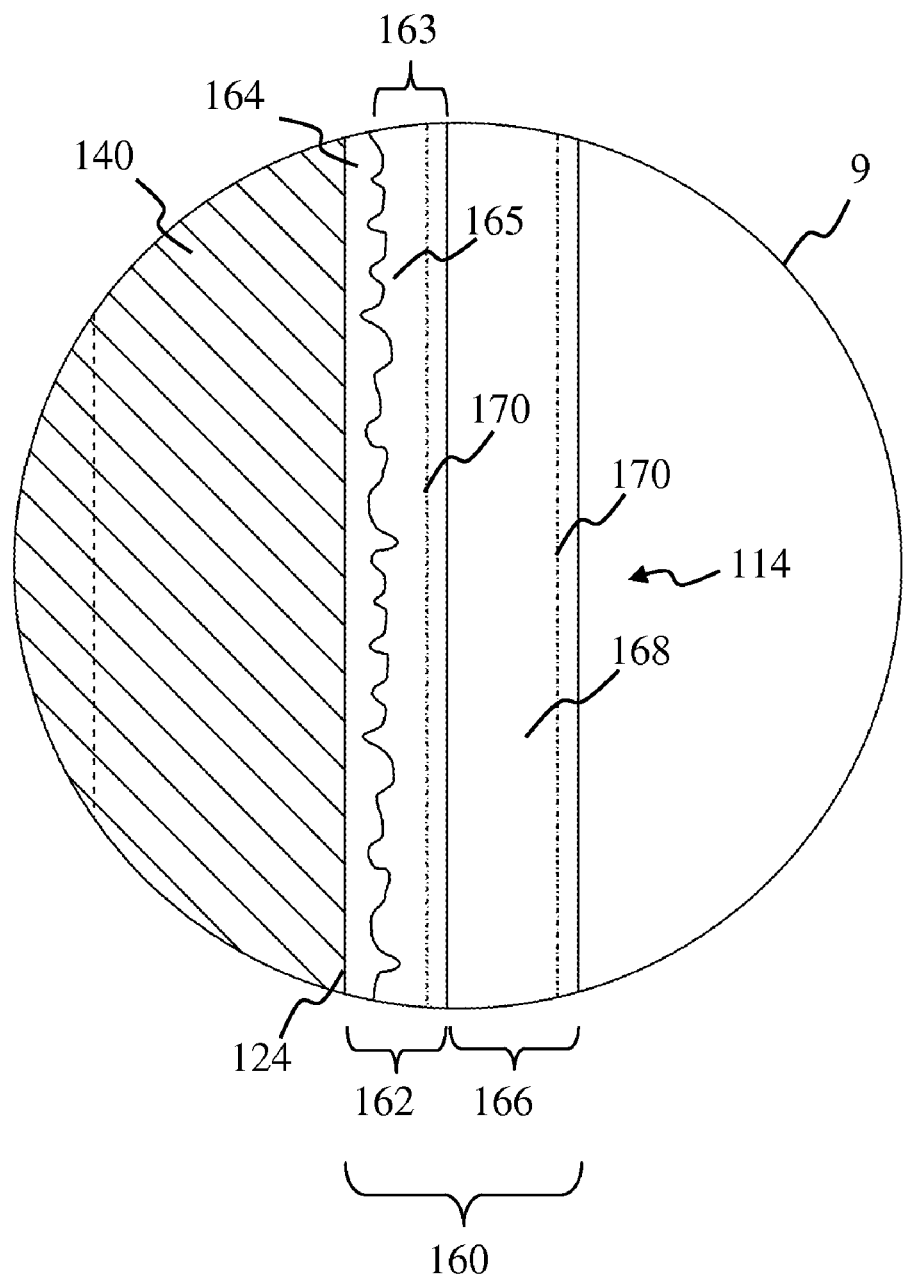
FIG. 9 shows a close-up cross-section of coating 160 taken at section 9 of FIG. 8.

Coating 160 covers a portion of core 158 to create composite building panel 112 of composite building panel structure 110 as shown in FIG. 1 and FIG. 6 through FIG. 9. Coating 160 creates an outer surface on building panel 112 that is ready to accept exterior or interior finishing as desired and also contributes to the strength of building panel 112. FIG. 6 shows a perspective view of core 158 with coating 160 applied, creating building panel structure 110 including building panel 112 according to the invention. FIG. 7 shows horizontal cross section 7-7 of building panel 112 of FIG. 6. FIG. 8 shows vertical cross section 8-8 of building panel 112 of building structure 110 of FIG. 6. FIG. 9 shows a close-up cross-section of coating 160 taken at section 9 of FIG. 8.

Coating 160 covers a portion of core 158. Coating 160 can cover a portion of core 158 for many different reasons. Coating 160 can cover a portion of core 158 to add strength to core 158. Coating 160 can cover a portion of core 158 to provide an aesthetically pleasing surface finish. Coating 160 can cover a portion of core 158 to provide a surface for accepting finish treatments such as paint, stucco, or other exterior finish treatments. Coating 160 can cover a portion of core 158 to create a layer of material which protects core 158 from weather, moisture, and other deteriorating elements. In some embodiments coating 160 covers exterior surfaces. In some embodiments coating 160 covers interior surfaces. In some embodiments coating 160 covers edge surfaces. Coating 160 can cover any surface of core 158 or a portion of any surface of core 158. In the embodiment shown in FIG. 1 through FIG. 9 coating 160 covers front surface 124 of core 158 to create first surface 114 of building panel 112. And in the embodiment shown in FIG. 1 through FIG. 9 coating 160 covers rear surface 126 of core 158 to create second surface 116 of building panel 112. In this way building panel 112 includes core 158 and coating 160 covering at least a portion of core 158. In this way building panel 112 includes core 158 and coating 160 covering at least a portion of front surface 124 or rear surface 126 of core 158.

Coating 160 in this embodiment is formed of multiple layers as shown in FIG. 9. In this embodiment coating 160 forms an acrylic modified cementitious membrane which provides structural strength to building panel 112 as well as providing a layer impervious to water and weather, and a layer that is ready to accept final exterior or interior finishes such as paint, stucco, or other finishes. In some embodiments coating 160 is formed of a single layer. In some embodiments coating 160 contains multiple layers. In this embodiment coating 160 is formed of inner scratch layer 162 and outer main brown layer 166. A scratch layer is a layer that adheres well to core 158 and provides a base for further layers, such as outer main brown layer 166, to adhere to. Inner scratch layer 162 is a cementitious mixture that can be formed from many different components. In some embodiments inner scratch layer 162 is formed of cement, aggregate, and an acrylic bonder. In some embodiments inner scratch layer 162 includes a wire mesh embedded in the cementitious mixture. In some embodiments inner scratch layer 162 is formed of other components. Further embodiments of inner scratch layer 162 will be discussed shortly.

Outer main brown layer 166 is formed of brown mixture 168 and fiberglass mesh 170 embedded in brown mixture 168 while brown mixture 168 is still wet. Brown mixture 168 is a cementitious mixture made of cement, aggregate, acrylic bonder, and fiberglass strands. Brown mixture 168 components are mixed together with water to form a cementitious mixture, and applied over inner scratch layer 162. Often brown mixture 168 is trowelled onto inner scratch layer 162. Fiberglass mesh 170 is embedded in brown mixture 168 while it is still wet. In this way building panel 112 includes core 158, and coating 160 covering a portion of core 158, where coating 160 includes inner scratch layer 162 and outer main brown layer 166. Outer main brown layer 166 includes brown mixture 168 comprising cement, aggregate, acrylic bonder, and fiberglass strands; and fiberglass mesh 170. In some embodiments the aggregate in brown mixture 168 includes sand. In some embodiments the aggregate in brown mixture 168 includes perlite. In some embodiments the aggregate in brown mixture 168 includes vermiculite. Perlite and vermiculite improve the fire-resistant qualities of building panel 112. Therefore perlite and/or vermiculite are used as aggregate in situations where a building panel structure 110 or a building panel 112 is required to possess stringent fire-resistant capabilities. In a particular embodiment brown mixture 168 is made by mixing together:

90 pounds of Portland cement (type 1 and 2)
    90 pounds of 20 grit silica sand
    90 pounds of 30 grit silica sand
    1½ gallons of acrylic bonder, such as AC-100 from Dryvit
    3 pounds of ¾" fiberglass strands
    2½ gallons of potable water.

In this embodiment the brown mixture 168 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 168 as brown mixture 168 is applied to inner scratch layer 162 and while brown mixture 168 is still wet. This mixture has been found to provide superior structural integrity, water and weather protection, and a surface optimum for applying further finish coatings if desired. It is to be understood that brown mixture 168 can be made from other ingredients for specific structural uses.

Inner scratch layer 162 can be formed of many different components. In some embodiments inner scratch layer 162 is a cementitious mixture applied over a wire mesh. In some embodiments inner scratch layer 162 is made up of multiple layers. In the embodiments shown in FIG. 1 through FIG. 9, inner scratch layer 162 is formed of two layers, first scratch layer A 164 and second scratch layer B 163. First scratch layer A 164 is a "dash" scratch coat which in this embodiment is machine sprayed onto core 158. In some embodiments first scratch layer A 164 is applied using other means. First scratch layer A 164 is a cementitious mixture made of cement, aggregate, and acrylic bonder. In some embodiments the aggregate includes sand. In some embodiments the aggregate includes perlite. In some embodiments the aggregate includes vermiculite. In a specific embodiment first scratch layer A 164 is formed by mixing together:

90 pounds of Portland cement (type 1 and 2)
    90 pounds of 20 grit silica sand
    90 pounds of 30 grit silica sand
    2½ gallons of acrylic bonder, such as AC-100 from Dryvit.
    2½ gallons of potable water.

In this embodiment the first scratch layer A 164 aggregate is made of two sizes of sand, 20 grit sand and 30 grit sand. This first scratch layer A 164 mixture has been found to adhere well to EPS foam block and provide a superior surface for accepting further layers of coating 160. It is to be understood that larger or smaller amounts of first scratch layer A 164 can be made by proportionately increasing or decreasing the ingredients. In some embodiments first scratch layer A 164 has other ingredients and proportions. Usually first scratch layer A 164 is allowed to cure (dry) before adding other layers.

Second scratch layer B 163 is formed of brown mixture 165 and fiberglass mesh 170. Fiberglass mesh 170 is embedded in brown mixture 165 while brown mixture 165 is being trowelled or otherwise applied to first scratch layer A 164 and while brown mixture 165 is still wet. Brown mixture 165 can be trowelled onto the surface of first scratch layer A 164 or applied by any other means which will allow brown mixture 165 to cover first scratch layer A and mesh 170 to be embedded into brown mixture 165.

Brown mixture 165 is a cementitious mixture made of cement, aggregate, acrylic bonder, and fiberglass strands. Brown mixture 165 components are mixed together with water to form a cementitious mixture, and applied to first scratch layer A 164 after first scratch layer A has cured. In some embodiments the aggregate in brown mixture 165 includes sand. In some embodiments the aggregate in brown mixture 165 includes perlite. In some embodiments the aggregate in brown mixture 165 includes vermiculite. In a particular embodiment brown mixture 165 is made by mixing together:

90 pounds of Portland cement (type 1 and 2)

90 pounds of 20 grit silica sand
90 pounds of 30 grit silica sand
1½ gallons of acrylic bonder, such as AC-100 from Dryvit
3 pounds of ¾" fiberglass strands
2½ gallons of potable water.

In this embodiment the brown mixture 165 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 165 while brown mixture 165 is still wet. This mixture has been found to provide superior structural integrity, water and weather protection, and a surface optimum for applying outer main brown layer 166. It is to be understood that brown mixture 165 can be made from other ingredients for specific structural uses. Usually second scratch layer B 163 is allowed to cure before adding other layers on top.

Coating 160, inner scratch layer 162, and outer main brown layer 166 can be made with many different thicknesses, depending on the specific use of building panel 112 and the structural strength needed. In some embodiments additional layers of inner scratch layer 162 and/or outer main brown layer 166 are added for additional strength. In some embodiments other layers are added. It is to be understood that finishing coatings are often applied to coating 160. These finishing coatings are applied for differing interior and exterior surface aesthetics and include paint, stucco, and other finishing layers and coatings.

In the embodiment shown in FIG. 9 inner scratch layer 162 is formed to be about ⅛" thick. Outer main brown layer 166 is formed to be about ¼" thick. When these layers cure, coating 160 provides a smooth surface for applying finish coatings, and is structurally very strong, energy efficient, and lightweight. Composite building panel 112 with core 158 and coating 160 has greater flex strength and shear strength than other block panels due to the structured composite layers of core 158 and coating 160. This specific embodiment is used for walls, roofs, and beams of buildings and structure. Additional layers and other thicknesses can be used according to the invention for building panel 112 to achieve different panel strengths and uses.

Figure 14:
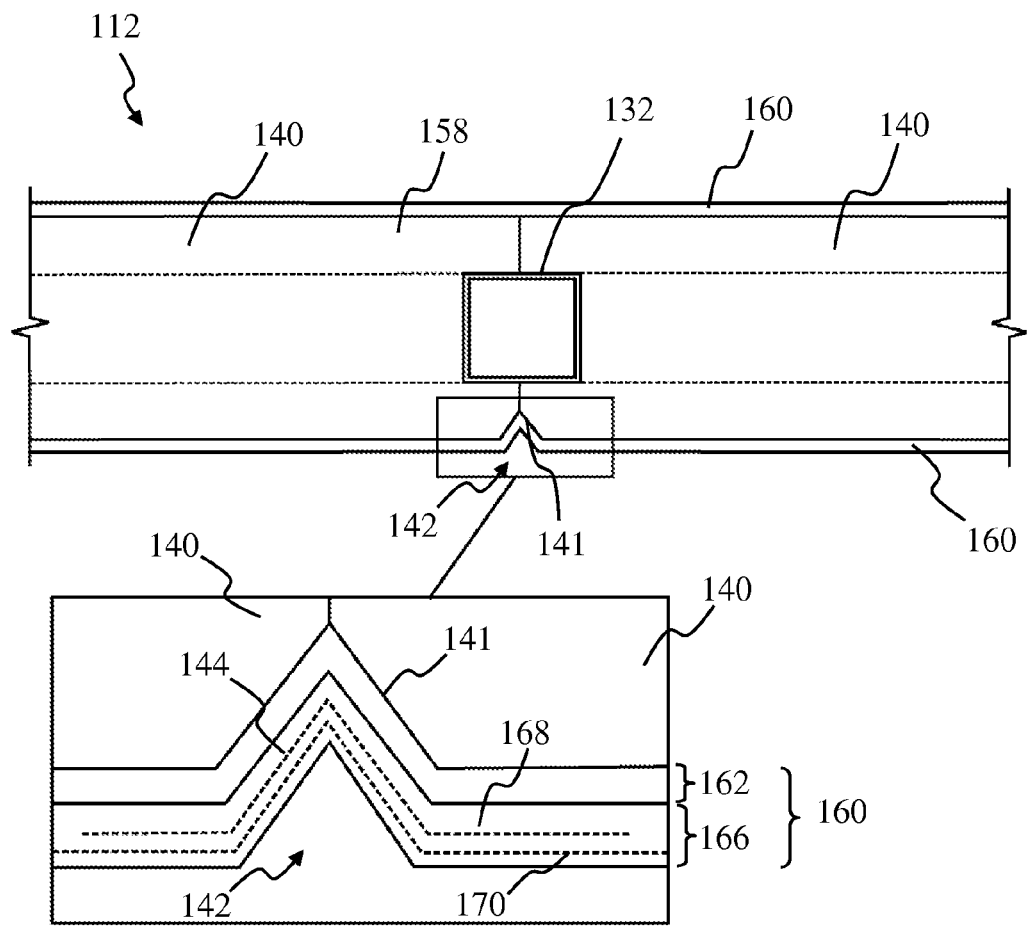
FIG. 14 is a horizontal cross-section of an embodiment of building panel 112 according to the invention using control joint 142 according to the invention.
Figure 15:
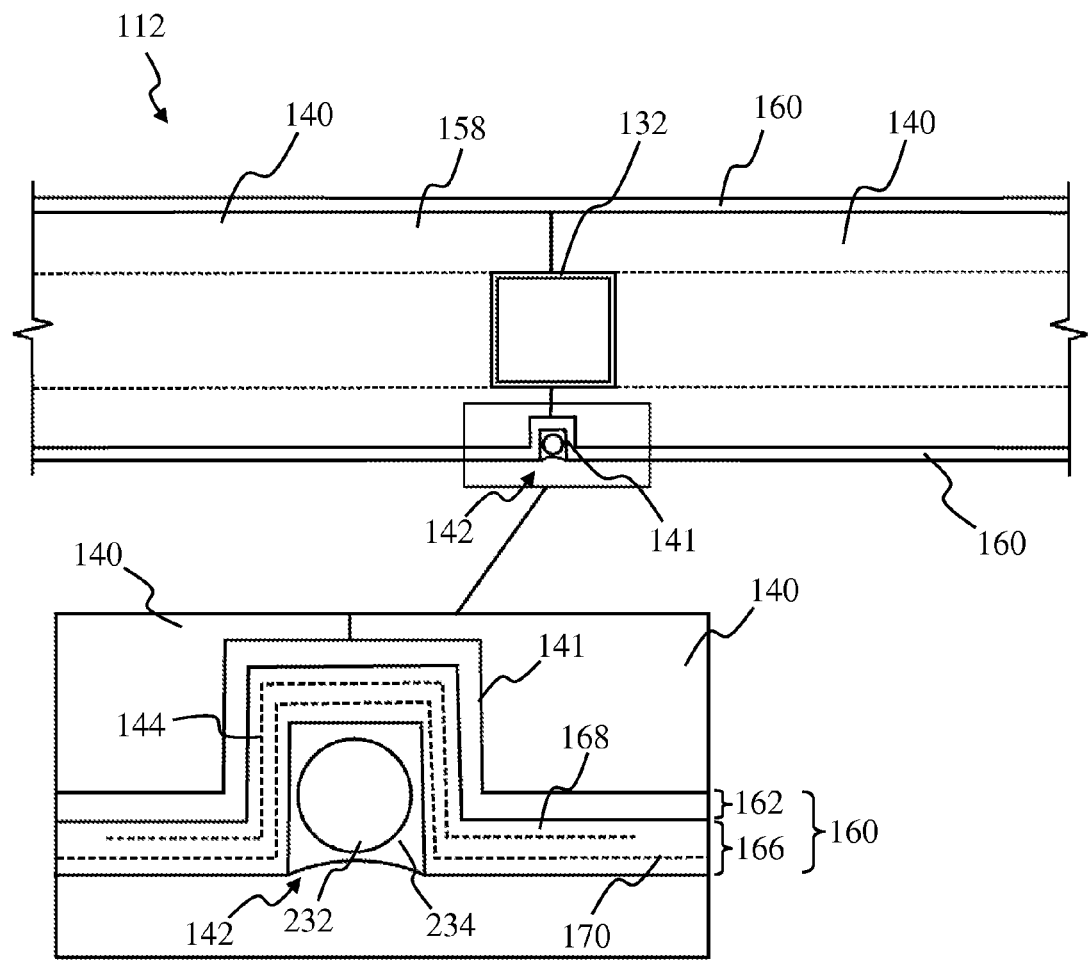
FIG. 15 is a horizontal cross-section of an embodiment of building panel 112 according to the invention with an additional embodiment of control joint 142 according to the invention.

In some embodiments control joints are cut into core 158 before coating 160 is applied. Embodiments of building panel 112 with control joints 142 are shown in FIG. 14 and FIG. 15 and will be discussed shortly. Holes and openings for windows and doors, access channels, and passageways for facilities and air handling can be cut into core 158 to create building panel 112 of a size and shape for the structure to be built. Core 158 and coating 160 can be easily formed into any size and shape structure, resulting in a lightweight, energy efficient, strong building panel 112.

FIG. 6 through FIG. 8 shows composite building panel structure 110 according to the invention, including building panel 112. A composite building panel structure is any structure built using one or more than one composite building panel as an element in the structure. Building panel structure 110 in this embodiment includes building panel 112 and footer 190, as shown in FIG. 6 and FIG. 8. Building panel 112 has building panel interlock element 154, which in this embodiment is building panel groove 154. Footer 190 has integral footer interlock element 194, which in this embodiment is footer tongue 194. Footer tongue 194 couples with building panel groove 154 to couple building panel 112 to footer 190. Footer interlock element 194 is integral to footer 190 because footer tongue 194 and footer 190 are one integral piece. In this embodiment footer 190 and footer tongue 194 are both made of concrete. Footer tongue 194 is poured together with footer 190 so that footer 190 and footer tongue 194 are one integral piece. Footer tongue 194 not only provides a coupling for building panel 112, footer tongue 194 also stops moisture, water, weather, and other elements from penetrating the interface between building panel 112 and footer tongue 194. In some embodiments footer 190 and footer tongue 194 are poured along the exterior edge of a structure. After building panels 112 are coupled to footer 190 to create building structure 110, even if water, moisture, or other elements penetrate the outer interface between building panel 112 and footer 190, they cannot "climb" footer tongue 194 to get to the other side of building panel 112. In this way integral footer tongue 194 provides moisture and weather protection for building panel structure 110.

Building panel interlock element 154 can take many different forms. In some embodiments building panel interlock element 154 is a building panel tongue. In some embodiments building panel interlock element 154 has a form other than a tongue or a groove. In some embodiments building panel groove 154 or footer tongue 194 have barbs, spikes, hooks or other surface effects which help to hold footer tongue 194 in building panel groove 154.

Footer interlock element 194 can take many different forms. In some embodiments footer interlock element 154 is a footer groove. In some embodiments footer interlock element 194 takes a form other than a tongue or a groove.

In the embodiment shown in FIG. 6 through FIG. 8, building panel structure 110 is constructed by first pouring concrete footer 190, including integral footer tongue 194, as a single pour. In some embodiments footer 190 is poured in multiple pours. Footer 190 and footer tongue 194 are formed using any method which results in footer 190 and footer tongue 194 being one integral concrete piece. Concrete foundation 192 is often poured next. Building panel 112 is coupled to footer 190 using footer tongue 194 and building panel groove 154. Building panel 112 can be constructed and coupled to footer 190 in many different ways. In this embodiments building panel 112 is constructed on-site and on footer 190. Core 158 is built on footer 190 and connected to footer 190. In this embodiment frame 130 is built and connected to footer 190 using bolts 188 as shown in FIG. 6. Shaped blocks 140 of core 158 are coupled to frame 130, to each other, and to footer tongue 194 to create core 158 coupled to footer 190 using footer tongue 194 and building panel groove 154. Coating 160 is applied to a portion of core 158. In this embodiment coating 160 is applied to front surface 124 of core 158 to create first surface 114 of building panel 112, and coating 160 is applied to rear surface 126 of core 158 to create second surface 116 of building panel 112 as shown. In some embodiments coating 160 is applied to core 158 and footer 190.

Building panel 112 in this embodiment has coating 160 applied to two surfaces, front surface 124 and rear surface 126, of core 158. In some embodiments coating 160 is applied to only one surface of core 158. In some embodiments coating 160 is applied to all surfaces of core 158. Coating 160 can be applied to any surface or portion of core 158 to create building panel 112 according to the invention.

In some embodiments of building panel structure 110, core 158 is built and covered with coating 160 to create building panel 112 before being coupled to footer 190. In some embodiments building panel 112 is made off-site and shipped to the building site to be coupled to footer 190. In some embodiments building panel 112 has track 228 (FIG. 18 and FIG. 19) coupled to core 158 to cover a part of one or more than one side 180. Track 228 will be discussed in detail shortly.

In the embodiment shown in FIG. 6, building panel 112 is made in-place on footer 190 as described above. Multiple building panels 112 can be added to composite building panel structure 110 to create walls, ceilings, floors, beams, bridges, of any other desired structure. In this embodiment composite building panel 112 forms part of building panel structure 110 which is a wall. In other embodiments building panel 112 forms parts of other structures and buildings in accordance with building panel structure 110. In some embodiments building panel structure 110 is a building. In other embodiments building panel structure 110 is a bridge. In some embodiments building panel structure 110 is a structure. Building panel structure 110 is any building, structure, or edifice of any shape, size or use which is formed of at least one building panel according to the invention.

Building panel structure 110 as shown in FIG. 6 through FIG. 8 is structurally sound as soon as coating 160 dries, and there is no need for external structural elements to hold building panel 112 in place while the rest of building panel structure 110 is created. In other types of foam block panel construction, for example, the foam block walls cannot support themselves until the entire structure is created and fitted together. The walls need to be supported by external structural elements during construction. These external structural elements used to hold the structure together during construction are not necessary when using building panel 112 according to the invention. Building panels 112 formed each day as part of building panel system 110 are structural sound and secure as soon as coating 160 dries, and each day whatever part of the complete structure has been completed is strong and secure and not in danger of collapsing.

Building panel 112 in this embodiment is stronger than other types of foam block walls. Core 158 and coating 160 give building panel structure 110 the strength to both hold building panel 112 secure during construction and withstand strong environmental elements and forces during the lifetime of the building, such as wind and earth movement. Building panel 112 is environmentally friendly, creating an energy efficient structure using recyclable material with less waste.

Building panels 112 can be used to form a wall, a floor, a roof, ceiling or any other part of a building or other building panel structure 110. Building panel 112 as part of building panel structure 110 according to the invention can be a complete building or a part of a building. Building panel 112 as part of building panel structure 110 can form part of a bridge, a fence, or other structure.

Figure 10:
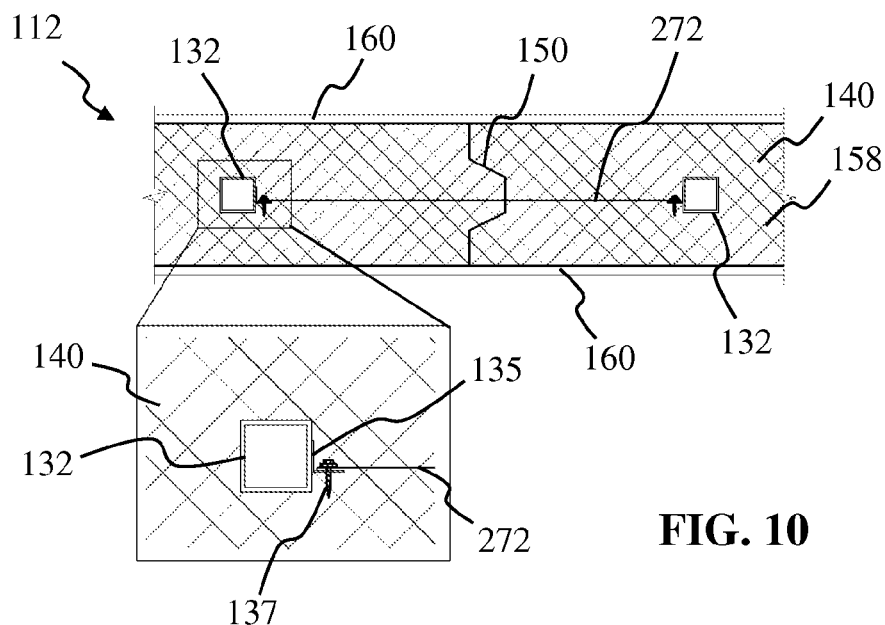
FIG. 10 is a horizontal cross-section of an embodiment of building panel 112 according to the invention, with building panel 112 including wire mesh 272 embedded in core 158.
Figure 11:
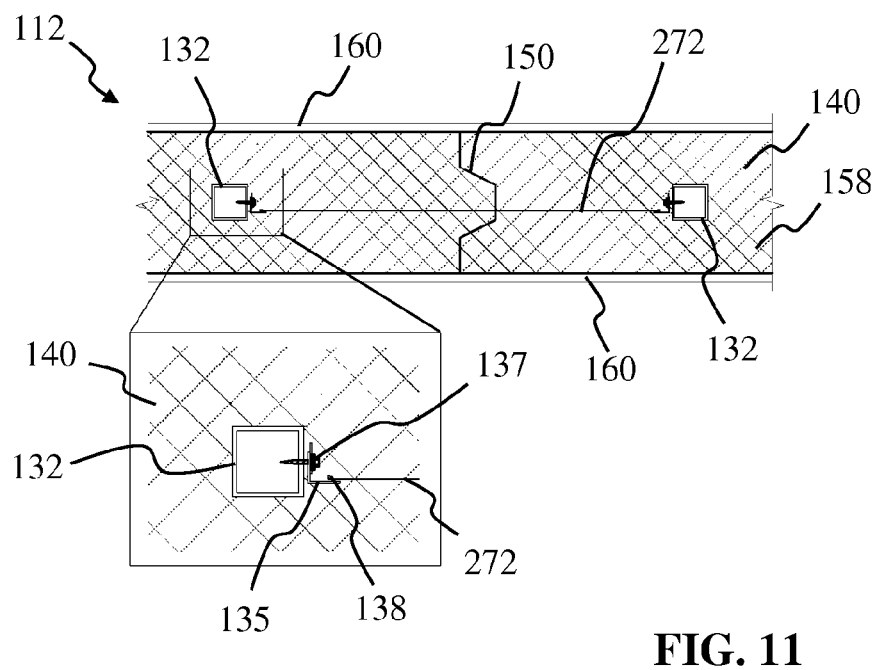
FIG. 11 is a horizontal cross-section of another embodiment of building panel 112 according to the invention, with building panel 112 including wire mesh 272 embedded in core 158.

FIG. 10 through FIG. 15 show additional embodiments of elements of building panel 112 and building panel system 110. FIG. 10 and FIG. 11 show horizontal cross-sections of two embodiments of building panel 112 where core 158 includes wire mesh 272 embedded in core 158. In this embodiment frame 130 of core 158 includes vertical frame members 132, which are steel box tube columns in this embodiment. Wire mesh 272 is stretched between and coupled to two adjacent vertical frame members 132 as shown in the drawings. Wire mesh 272 and vertical frame members 132 can be coupled in many different ways. In the embodiments shown, wire mesh 272 is coupled to L-bracket 135. L-Bracket 135 is coupled to vertical frame member 132. In this way core 158 includes vertical frame members 132 and wire mesh 272, where wire mesh 272 is coupled to two adjacent vertical frame members 132. In this way core 158 includes vertical frame members 132 and wire mesh 272, where wire mesh 272 is stretched between two adjacent vertical frame members 132. Blocks 140 are cut to shape and placed around vertical frame members 132 and wire mesh 272. Vertical frame members 132 and wire mesh 272 are covered with blocks 140. In this way core 158 includes wire mesh 272 embedded in blocks 140 of core 158. Wire mesh 272 can be coupled to L-bracket 135 in many different ways. In FIG. 10 wire mesh 272 is coupled to L-bracket 135 using screw 137. L-bracket 135 is coupled to vertical frame member 132 by welding. In FIG. 11 wire mesh 272 is coupled to L-bracket 135 using hooks 138. L-bracket 135 is coupled to vertical frame member 132 using screw 137. In some embodiments wire mesh 272 is coupled to vertical frame members 132 using other coupling means. In some embodiments wire mesh 272 is chain-link fence. Wire mesh 272 adds structural strength to building panel 112.

Figure 12:
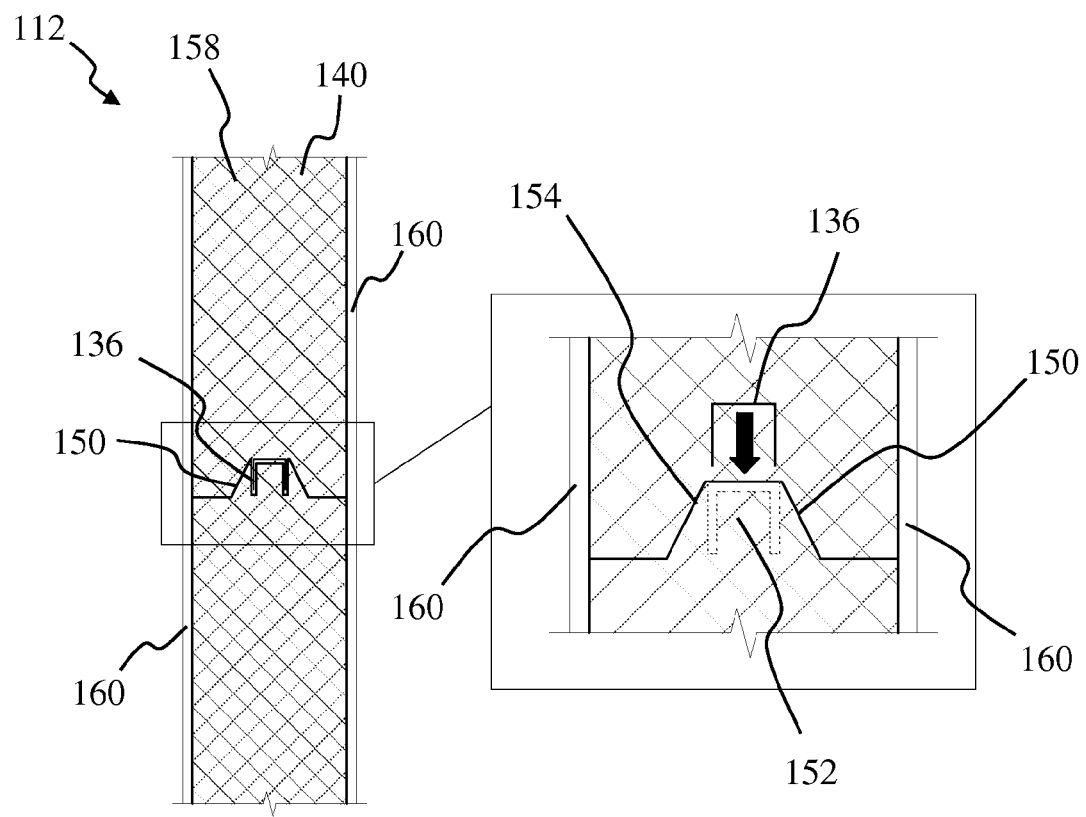
FIG. 12 shows a vertical cross section of an embodiment of building panel 112, with building panel 112 including C-channel 136 embedded in insulating structural block tongue 152 of core 158.

FIG. 12 shows an embodiment of building panel 112 where C-channel 136 is embedded in block tongue 152 of core 158. FIG. 12 shows a vertical cross-section of an embodiment of building panel 112, showing core 158, coating 160, and block 140 of core 158 interlocking using interlock elements 150 which include block groove 154 and block tongue 152. C-channel 136 is embedded in block tongue 152. This provides additional strength to blocks 140, core 158, and building panel 112. Block tongue 152 is strengthened and protected by C-channel 136. This creates a stronger connection between the two blocks 140, which further strengthens core 158. In this way core 158 of building panel 112 includes C-channel 136 embedded in block tongue 152.

Figure 13:
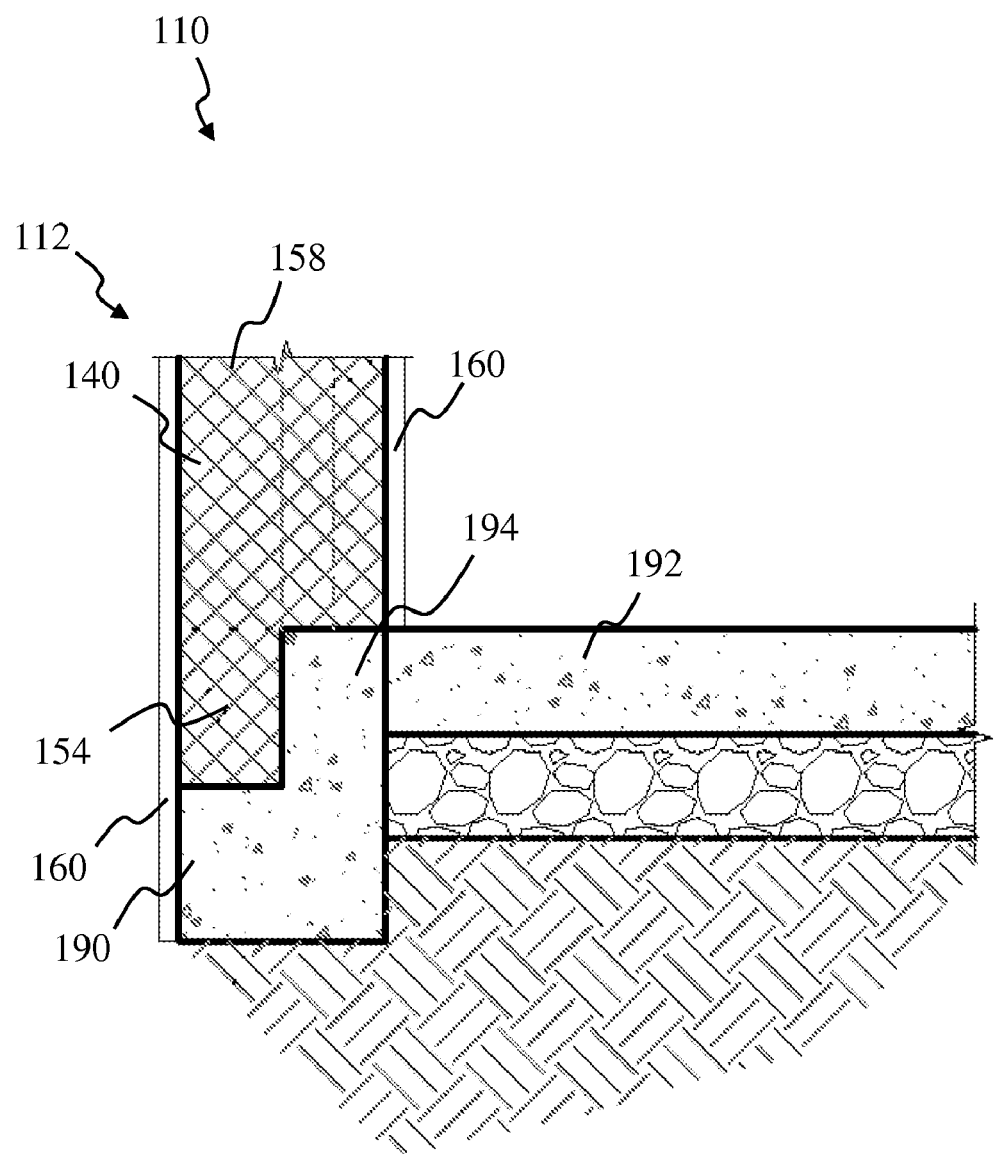
FIG. 13 shows an embodiment of building panel structure 110 where building panel 112 includes an additional embodiment of building panel tongue 154 and footer 190 includes an additional embodiment of footer tongue 194.

FIG. 13 shows an embodiment of building panel structure 110 illustrating an alternate embodiment of footer tongue 194 and building panel tongue 154. In this embodiment of building panel structure 110, building panel 112 includes building panel tongue 154. Footer 190 includes footer tongue 194. Building panel tongue 154 interlocks with footer tongue 194 to couple building panel 112 to footer 190. Coating 160 covers core 158 and footer 190. Coating 160 creates a barrier to prevent moisture from entering between footer 190 and core 158. But even if moisture should penetrate coating 160, moisture, water, and elements cannot climb footer tongue 194. This protects the interior of building panel structure 110 from water, moisture, and the elements.

FIG. 14 and FIG. 15 show embodiments of building panel 112 where building panel 112 includes control joint 142. Control joint 142 is used to control and prevent cracking of coating 160. Control joints 142 can be included anywhere on building panel 112, including on any surface and running in any direction. Control joint 142 is often placed at areas of stress in building panel 112 or coating 160, where cracking is likely to occur, such as at window corners, or where two walls meet or where two blocks 140 meet. Control joint 142 includes notch 141 cut in core 158 and control joint reinforcement mesh 144. Control joint 142 includes control joint reinforcement mesh 144 to inhibit cracking of coating 160. Notch 141 acts to direct any cracking that does occur in a particular predetermined direction. Control joint reinforcement mesh 144 is a metal mesh in some embodiments. In some embodiments control joint reinforcement mesh 144 is a fiberglass mesh. In some embodiments control joint reinforcement mesh 144 is made of other materials. Control joint 142 is created by cutting notch 141 in insulating structural block 140 of core 158 and applying control joint reinforcement mesh 144 in coating 160 at control joint 142. FIG. 14 shows an embodiment of building panel 112 where control joint 142 according to the invention includes a triangular-shaped notch 141 in building panel 112. In this embodiment control joint reinforcement mesh 144 is embedded in brown mixture 168 of coating 160 while brown mixture 168 is still wet, similar to the application of fiberglass mesh 170 in coating 160. Control joint reinforcement mesh 144 covers notch 141 and often covers several inches on either side of notch 141. In a specific embodiment control joint reinforcement mesh 144 runs six inches on either side of notch 141. Control joint reinforcement mesh 144 strengthens coating 160 at control joint 142, inhibiting cracks in coating 160 which can be unsightly and can allow moisture and elements into building panel 112. In this way building panel 112 includes control joint 142, where control joint 142 includes notch 141 and control joint reinforcement mesh 144.

FIG. 15 shows an embodiment of building panel 112 with control joint 142 according to the invention, where control joint 142 includes square notch 141 in building panel 112, and backer rod 232 and sealant 234. In this embodiment of control joint 142 according to the invention, control joint reinforcement mesh 144 is embedded in brown mixture 168 of coating 160 at notch 141 while brown mixture 168 is still wet, similar to the application of fiberglass mesh 170 in brown mixture 168. After coating 160 has cured, backer rod 232 and sealant 234 is used to fill in notch 141 of control joint 142. This embodiment of control joint 142 creates a flat surface on building panel 112 once finish coatings are applied. In this way building panel 112 includes control joint 142, where control joint 142 includes notch 141, control joint reinforcement mesh 144, backer rod 232, and sealant 234.

Figure 16:
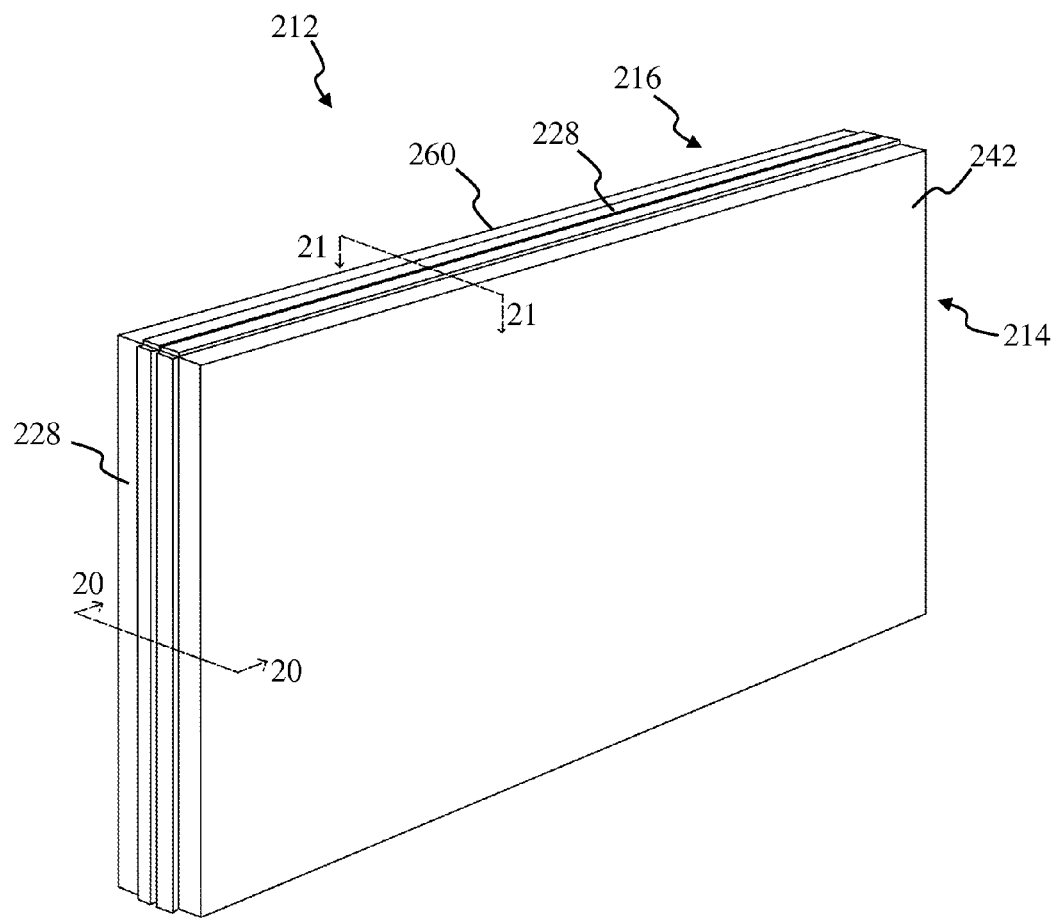
FIG. 16 is a perspective view of an embodiment of building panel 212 according to the invention.
Figure 20:
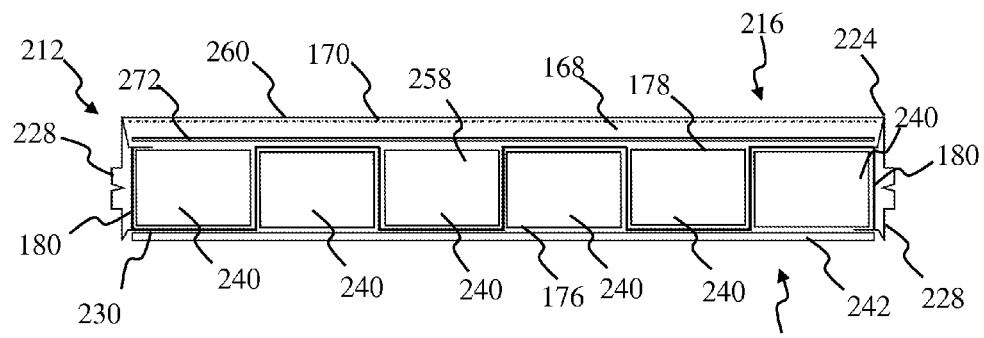
FIG. 20 is a horizontal cross section of building panel 212 of FIG. 16, using core 258 and coating 260.

Building panel structure 110 according to the invention includes building panels with cores and coatings of many different types. FIG. 16 through FIG. 21 show an additional embodiment of a building panel according to the invention. FIG. 16 is a perspective view of building panel 212 according to the invention. FIG. 17 is a perspective view of core 258 of building panel 212 of FIG. 16. FIG. 18 is an end view and FIG. 19 a perspective view of track 228 used with building panel 212 of FIG. 16. FIG. 20 is a horizontal cross section, and FIG. 21 a vertical cross section, of building panel 212 of FIG. 16 using core 258, track 228, and coating 260.

Building panel 212 according to the invention includes core 258 and track 228 covering a portion of an edge of core 258. Building panel 212 as shown in the embodiment of FIG. 16 has first surface 214, second surface 216, and four edges 180 covered by tracks 228. In this embodiment first surface 214 is an interior surface and includes wallboard 242. Wallboard 242 is made of sheet rock in this embodiment. In this embodiment second surface 216 is an exterior surface which includes coating 260. In some embodiments of building panel 212, both first surface 214 and second surface 216 include coating 260.

FIG. 17 shows a perspective view of core 258 as used with building panel 212 of FIG. 16. Core 258 uses frame 230 which has a "square serpentine" shape as shown in FIG. 17 and FIG. 20, with rectangles of insulating structural block 240 filling in the space within frame 230 squares. Frame 230 is galvanized steel in this embodiment. In some embodiments frame 230 is other types of metal. In other embodiments frame 230 can be formed from other structural materials such as wood, plastic, or an equivalent material. In this embodiment insulating structural blocks 240 are EPS foam blocks, one pound density. Other materials and densities can be used for blocks 240. Core 258 is an example of one type of core that can be used to create building panel 212. Other shapes and sizes of frame 230 and blocks 240 can be used to form core 258 of building panel 212 according to the needs of the building.

Core 258 in the embodiment shown in FIG. 17 has front surface 176 which in this embodiment is covered with wallboard 242 to create first surface 214 of building panel 212. Core 258 in this embodiment has rear surface 178 which in this embodiment is covered with coating 260 to create second surface 216 of building panel 212. Core 258 has four edges 180 in this embodiment. In this embodiment edges 180 are covered with tracks 228. In this way core 258 has front surface 176, rear surface 178, and at least one edge 180 covered with track 228. In this way core 258 has front surface 176, rear surface 178, sides 180, and tracks 228 coupled to core 258. Core 258 according to the invention can have any number, size, and shape of surfaces, where 'surface' includes both sides and edges. In this embodiment of building panel 212 a portion of one or more than one of the surfaces of core 258 is covered with coating 260. In some embodiments coating 260 is applied to a both front surface 176 and rear surface 178. In some embodiments other coatings are applied to front surface 176 or rear surface 178. In some embodiments of building panel 212 a portion of one or more than one of the surfaces of core 258 of building panel 212 is covered with coating 160 as discussed earlier. In some embodiments of building panel 212 a portion of one or more than one of the surfaces of core 258 of building panel 212 is covered with a different coating. Core 258 can have a coating applied to a portion of any surface, such as coating 260, coating 160, coating 360 (discussed later) or another coating according to the invention. These coatings protect the surfaces of core 258 and building panel 212, provide strength to building panel 212, keep elements, weather, and moisture from permeating building panel 212, and provide a smooth, aesthetically pleasing surface for applying any desired finish coatings. Coating 260 will be further discussed shortly.

Building panel 212 includes core 258, and track 228 coupled to core 258. FIG. 18 and FIG. 19 show the details of this embodiment of track 228. Track 228 has many uses. Track 228 protects the edge surfaces of core 258 that it covers, provides a means to couple building panel 212 with other building panels and other structures, supplies a screed edge for applying a predetermined thickness of coating on core 258, and provides a means for moisture and water that permeate building panel 212 to exit building panel 212.

Figure 21:
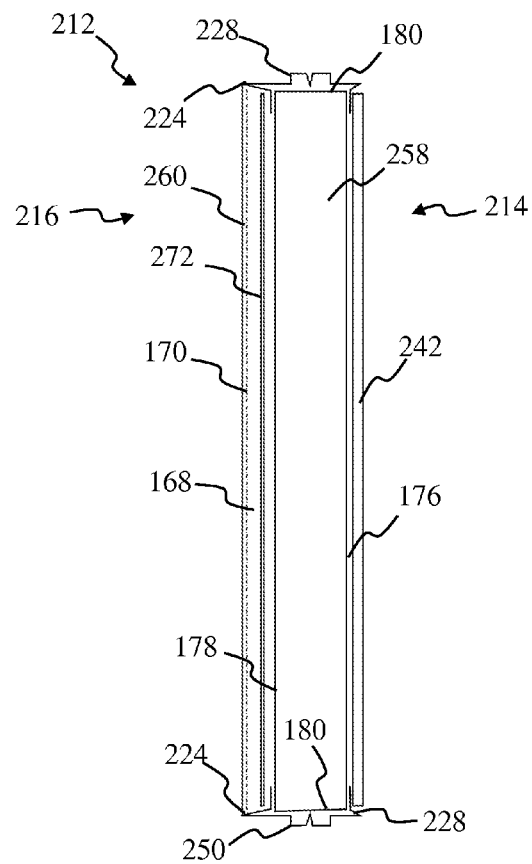
FIG. 21 is a vertical cross section of building panel 212 of FIG. 16, using core 258 and coating 260.

Track 228 includes base portion 220, where base portion 220 covers a portion of edge 180 of core 258. In this embodiment tracks 228 are coupled to each of the four edge surfaces 180 of core 258 as shown in FIG. 16, FIG. 20, and FIG. 21. In this embodiment base portion 220 of tracks 228 covers all four edge surfaces 180 of core 258. In some embodiments base portions 220 of track 228 covers some but not all of the edge surfaces 180 of core 258. Base portion 220 of track 228 according to the invention covers at least a portion of one edge 180 of core 258. In this way building panel 212 includes core 258 with a front surface 176, rear surface 178, edge 180, and track 228 coupled to core 258. Track 228 includes base portion 220 covering a portion of edge 180.

Base portion 220 of track 228 includes rain drain channel 250, as shown in FIG. 18 and FIG. 19. Rain drain channel 250 collects moisture and water which may permeate into the interior of building panel 212 and directs it to weep holes which allow the moisture to exit building panel 212. In this way rain drain channels 250 keep building panel 212 free from internal moisture buildup which can cause rot, mold or degradation of building panel 212. In this way base portion 220 of track 228 includes rain drain channel 250.

Track 228 in this embodiment includes first opposing arm 226 and second opposing arm 227. Core 258 slips between first and second opposing arms 226 and 227. First and second opposing arms 226 and 227 couple track 228 to core 258 while building panel 212 is being formed. In some embodiments first opposing arm 226 and second opposing arm 227 frictionally engage front surface 176 and rear surface 178, respectively, of core 258. In this way track 228 includes first opposing arm 226 and second opposing arm 227. In some embodiments track 228 does not include first opposing arm 226 and second opposing arm 227.

Figure 22:
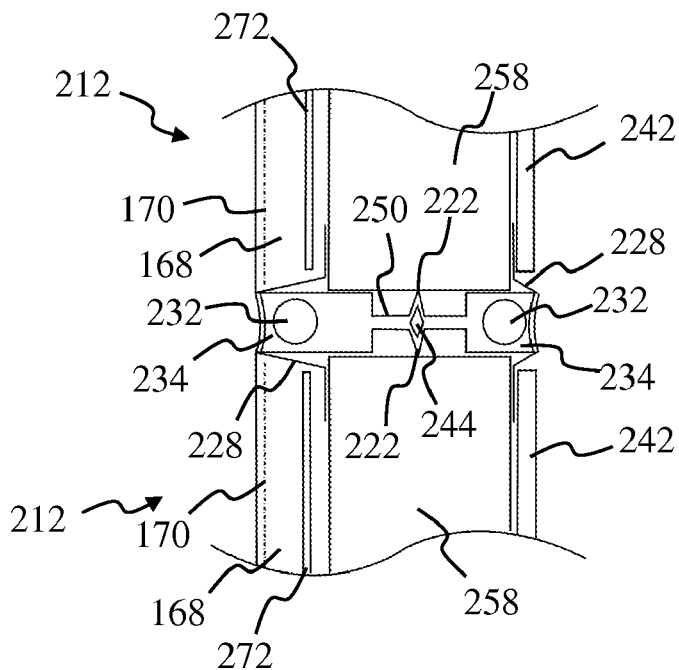
FIG. 22 shows a cross-section of two building panels 212 connected track-to-track according to the invention.

Track 228 in this embodiment includes seal spacer channel 222. Seal spacer channel 222 is used to contain seal 244 when two building panels 212 are being coupled together at their respective tracks 228 as shown in FIG. 22. Seal 244 provides a flexible, water- and air-tight seal between two building panels 212. In this way building panel 212 includes track 228, where track 228 includes seal spacer channel 222.

Track 228 in the embodiment shown includes screed boundaries 224. Screed boundaries 224 are used as a screed reference when a coating such as coating 260 or coating 160 is being applied to core 258. Coating 260 in this embodiment is trowelled onto second surface 178 and leveled off using screed boundary 224. In this way screed boundary 224 is used to create coating 260 with a flat level surface, where the surface is defined by screed boundary 224. In this way building panel 212 includes track 228, where track 228 includes screed boundaries 224. In some embodiments of track 228 only one screed boundary 224 is included in track 228. In some embodiments track 228 does not include any screed boundaries 224.

FIG. 20 is a horizontal cross-section of building panel 212 taken at section 20-20 of FIG. 16, and FIG. 21 is a vertical cross-section of building panel 212 taken at section 21-21 of FIG. 16. Tracks 228 are coupled to ends 180 of core 258. Front surface 176 of core 258 is covered with wallboard 242 to create first surface 214 of building panel 212. In this embodiment wallboard 242 is a ⅝" wallboard. First surface 214 of building panel 212 is used in this embodiment for interior walls and can have an interior finish applied such as tape, plaster, and/or paint. In some embodiments other finishes are used.

Rear surface 178 of core 258 has coating 260 applied to it to create second surface 216 of building panel 212. Coating 260 in this embodiment includes a layer of wire mesh 272, covered by brown mixture 168 and fiberglass mesh 170 embedded in brown mixture 168. Brown mixture 168 is a cementitious mixture made of cement, aggregate, acrylic bonder, and fiberglass strands, as discussed earlier with regard to coating 160. Wire mesh 272 in this embodiment is a 9 gage concrete wire mesh. Fiberglass mesh 170 is embedded in brown mixture 168 while brown mixture 168 is still wet, as previously discussed in regard to coating 160. Coating 260 can be finished with any desired finish coating including an elastomeric, cementitious, or acrylic finish coat, depending on the usage of building panel 212. Brown mixture 168 has the same components and optional components as discussed earlier with regard to coating 160.

Building panel 212 is fabricated by forming core 258 from frame 230 and block 240, coupling tracks 228 to core 258, applying wallboard 242 to front surface 176 of core 258 to create first surface 214 of building panel 212, and applying coating 260 to rear surface 178 of core 258 to create second surface 216 of building panel 212. Building panel 212 in some embodiments is coupled to other building panels or other structures to create building panel structure 110.

Building panel 212 is light, durable, environmentally friendly, strong, energy efficient and configurable. Building panel 212 is often used for walls and other structures of commercial buildings. Frame 230 and coating 260 provide strength to building panel 212. Insulating structural EPS foam blocks 240 provide energy efficiency with a material that uses renewable resources. In some embodiments coating 260 is applied to both sides of building panel 212. In some embodiments other coatings are used on one or both sides of building panel 212. Building panel 212 can be formed in any size and shape to create the desired size and shape building, structure, edifice, beam, fence, etc. Utility and access holes are cut into or through building panel 212 as needed. Building panel 212 in this embodiment is pre-fabricated and shipped assembled to the construction site. In some embodiments building panel 212 is fabricated at the construction site.

Figure 23:
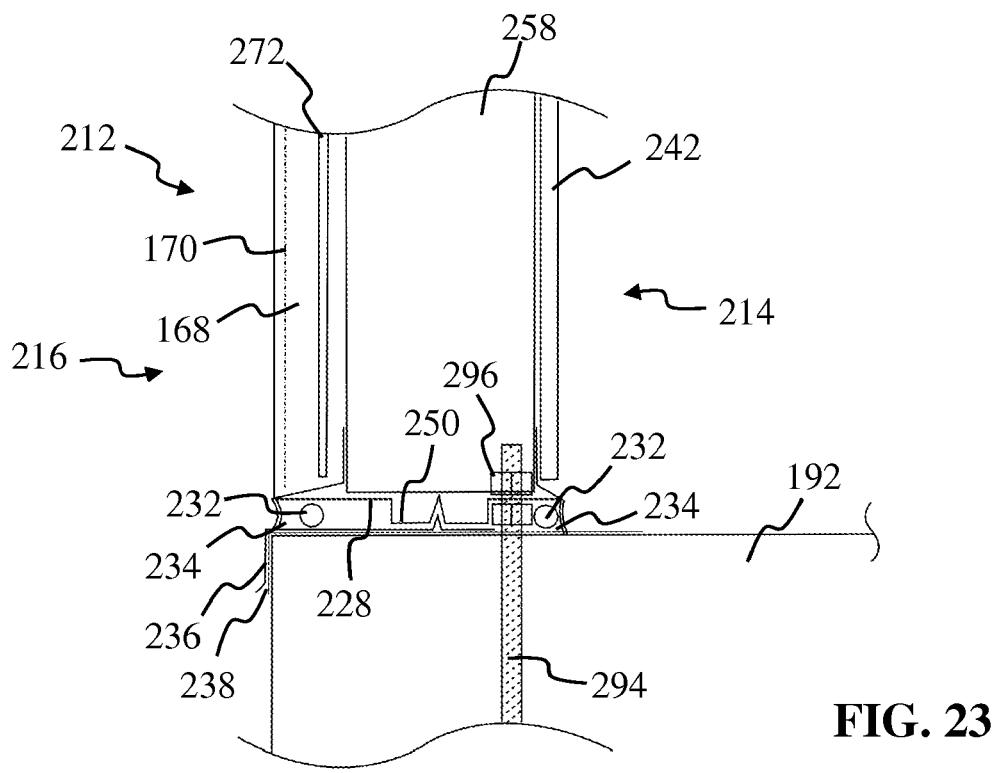
FIG. 23 shows a cross-section of building panel 212 connected to concrete foundation 192 according to the invention.

FIG. 22 and FIG. 23 illustrate examples of how building panels 212 can be coupled to each other and to other structures. FIG. 22 shows a cross-section of two building panels 212 connected track-to-track according to the invention. FIG. 23 shows a cross-section of building panel 212 connected to concrete foundation 192 according to the invention. FIG. 22 shows two building panels 212 connected end-to-end by butting tracks 228 together, with rubber seal spacer 244 and backer rods 232 in between as shown. Seal spacer 244 is placed between the two adjacent seal spacer channels 222 and provides a flexible sealant between the two tracks 228. Backer rods 232 provide the spacing for each end of the tracks 228. Sealant 234 is used to fill the air spaces between the two tracks 228. In this embodiment caulk is used as sealant 234. In some embodiments sealants other than caulk are used as sealant 234, depending on the use of the structure. Rain drain channels 250 collect and drain moisture between the two building panels 212. In this way any water, moisture, or other fluids which happen to penetrate into the interior of building panel 212 is removed so that corrosion and rot will not occur.

FIG. 23 shows building panel 212 coupled to concrete foundation 192. In some embodiments building panel 212 is coupled to concrete footer 190. In the embodiment shown, bituthane seal 238 is applied to concrete foundation 192, followed by drip flashing 236. Track 228 is placed over drip flashing 236, with backer rods 232 in between. Anchor bolt 294 is used to mechanically couple building panel 212 to concrete foundation 192. In this embodiment nut, spacer, and washer 296 is used to connect to anchor bolt 294. Sealant 234 is used to fill in air spaces and seal the connection. Rain drain channels 250 collect and direct moisture and water to weep holes where it is allowed to escape.

Figure 24:
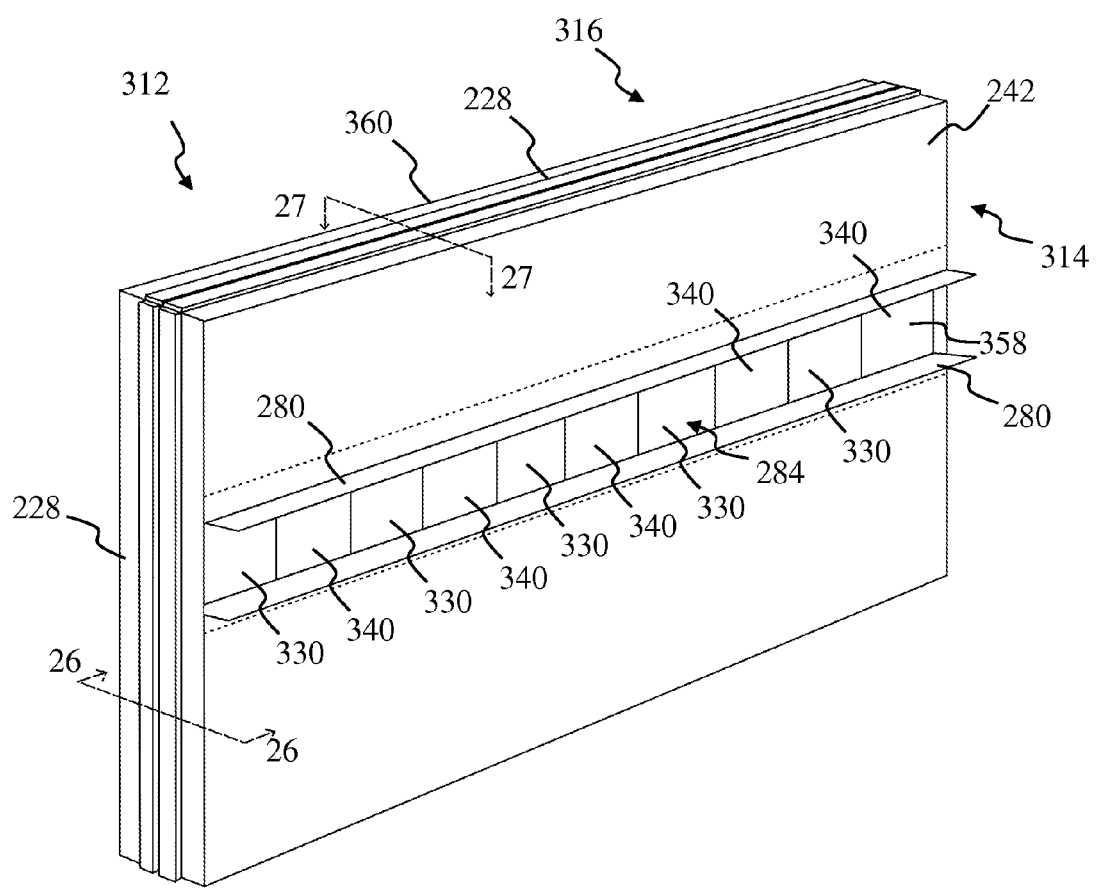
FIG. 24 is a perspective view of building panel 312 according to the invention.
Figure 25:
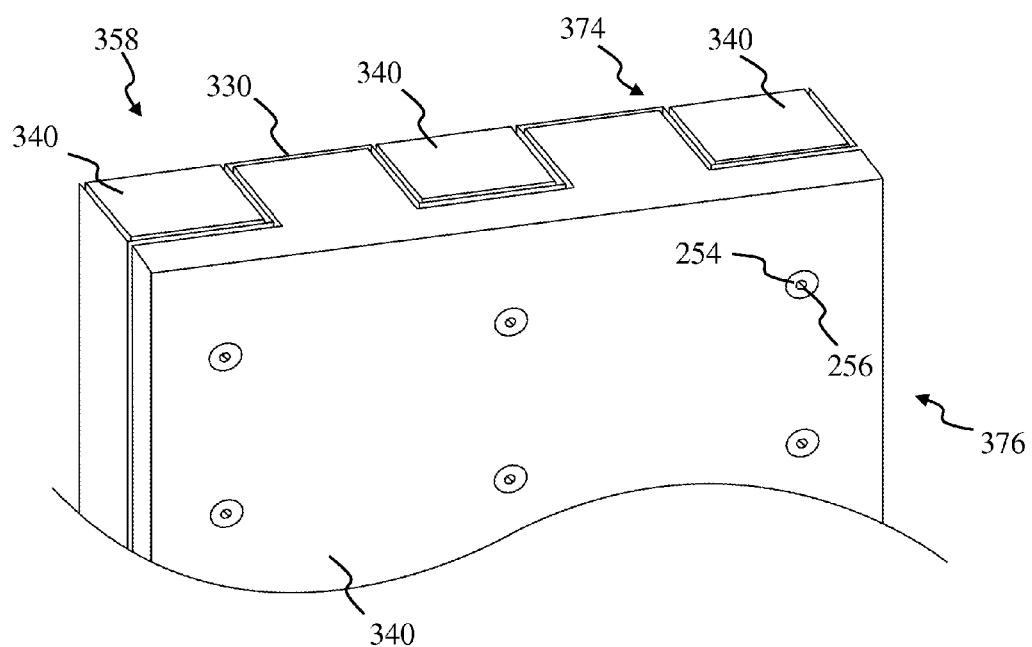
FIG. 25 is a perspective view of core 358 of building panel 312 of FIG. 24.
Figure 26:
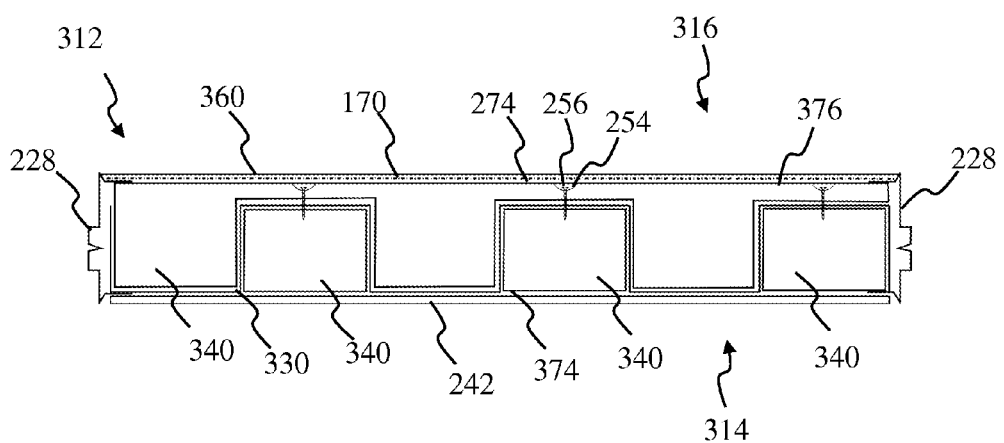
FIG. 26 is a horizontal cross-section of building panel 312 of FIG. 24.

FIG. 24 through FIG. 27 illustrate another embodiment of a building panel according to the invention. FIG. 24 shows a perspective view of building panel 312 according to the invention. FIG. 25 shows a perspective view of core 358 of building panel 312 of FIG. 24. FIG. 26 is a horizontal cross-section, and FIG. 27 a vertical cross section, of building panel 312 of FIG. 24. Building panel 312 uses access channels 280 to provide access to frame 330 of building panel 312 according to the invention. Access to frame 330 can be used for many purposes. In some embodiments access to frame 330 is used to interconnect building panel 312 to other structures such as floors, walls, or other building panels.

Building panel 312 includes core 358 and coating 360, where coating 360 covers a portion of core 358. Building panel 312 has tracks 228 covering the edges of core 358. Building panel 312 has first surface 314 which includes wallboard 242, and second surface 316, where second surface 316 includes coating 360.

Core 358 uses frame 330 in a square serpentine shape, with thicker insulting structural blocks 340 used on one side of core 358 than the other side, as shown in FIG. 25 and FIG. 26. Core 358 has front surface 374 and rear surface 376. In this embodiment insulating structural blocks 340 are thicker on rear surface 376 of core 358 than they are on front surface 374 of core 358. Blocks 340 are held to frame 330 in this embodiment with screws 256 and pressure spreaders 254. Pressure spreader 254 (one of several labeled) distributes the pressure of screw 256 (one of several labeled) over an area of block 340, allowing pressure spreader 256 to grab onto block 340 and hold it to frame 330. Without pressure spreader 254, screw 256 may make a hole in insulating structural block 340 instead of holding block 340 to frame 330. In this embodiment screw 256 and pressure spreader 254 are from Windlock company.

Figure 27:
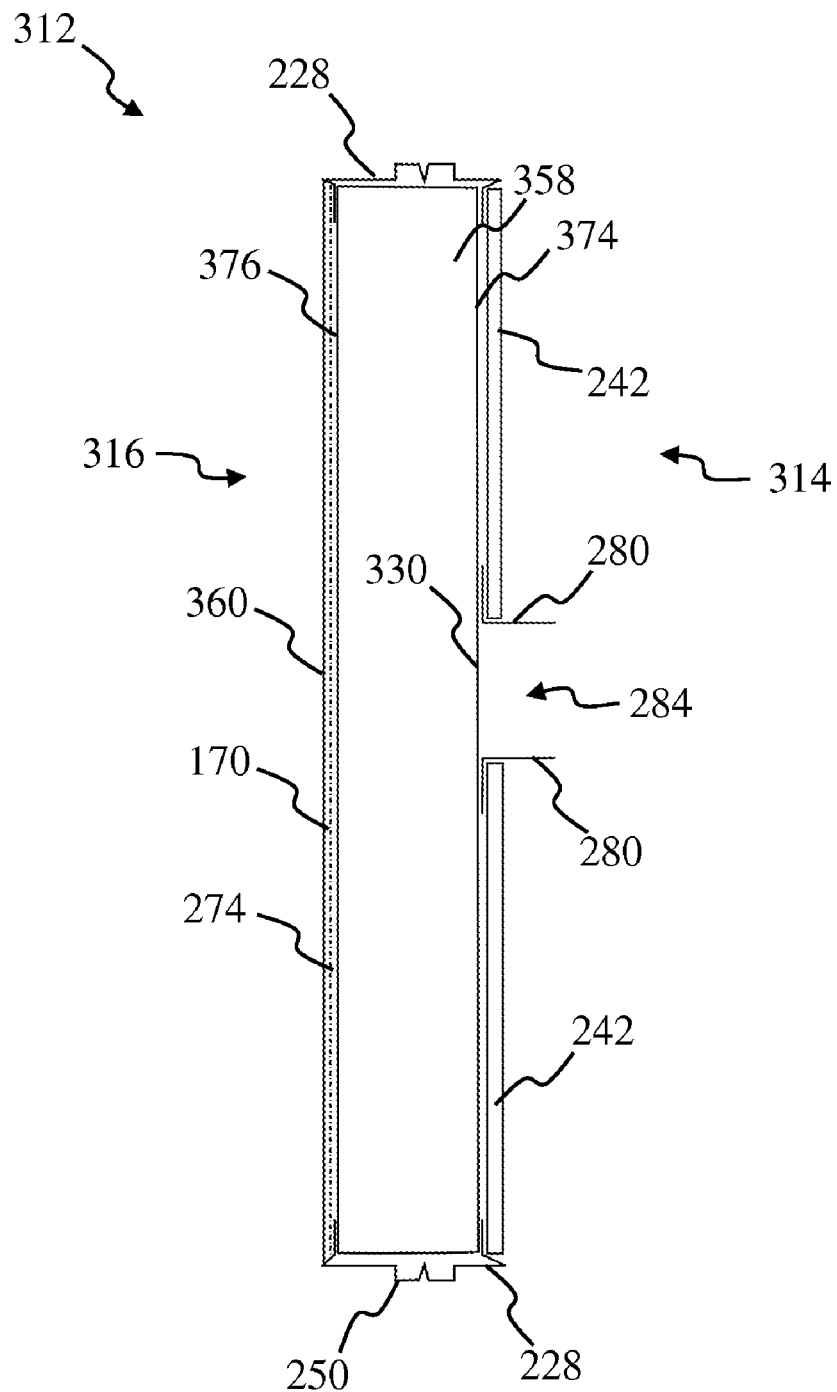
FIG. 27 is a vertical cross-section of building panel 312 of FIG. 24.

FIG. 26 is a horizontal cross-section of building panel 312 taken at section 26-26 of FIG. 24. FIG. 27 is a vertical cross-section of building panel 312 taken at section 27-27 of FIG. 24. First surface 314 in this embodiment of composite building panel 312 has wallboard 242 coupled to front surface 374 of core 358. Second surface 316 of building panel 312 has coating 360 covering rear surface 376 of core 358. Coating 360 in this embodiment is a "synthetic stucco" finish, which in this embodiment is an Exterior Insulation and Finish System (EIFS) coating. In this embodiment coating 360 is made of fiberglass mesh 170 embedded into polymer-based adhesive 274 such as Primus manufactured by Dryvit. Finish coatings can be applied to wallboard 242 and coating 360. It should be understood that in some embodiments coating 160 as described earlier can be applied to front surface 374 and/or rear surface 376 of core 358. In some embodiments of composite building panel 312 first side 314 and/or second side 316 include coating 160. It should be understood that in some embodiments coating 260 as described earlier can be applied to front surface 374 and/or rear surface 376 of core 358. In some embodiments of composite building panel 312 first side 314 and/or second side 316 include coating 260. In some embodiments of building panel 312 coating 160, coating 260, or other coatings are applied to a portion of core 358 to create building panel 312.

In the embodiment of building panel 312 shown in FIG. 24 through FIG. 27, both core 358 and coating 360 provided strength and stability to building panel 312. Building panel 312 can be used for many building applications, for example but not by way of limitation, commercial or residential building applications. Building panel 312 provides superior energy efficiency with lightweight, high-strength building panels 312. Any moisture or water that permeates building panel 312 will be routed horizontally and vertically through rain drain channels 250 of track 228 to weep holes where they exit the structure.

Access channels 280 are used to terminate and seal wallboard 242 at opening 284, where opening 284 in this embodiment is for a floor structure to connect to frame 330. In this embodiment access channels 280 are 2"×2" galvanized steel channel, which can be welded or bolted to frame 330. This leaves opening 284, where wallboard 242 does not cover frame 330 and blocks 340. In this embodiment opening 284 is 12" in height, and allows a floor structure to be connected to frame 330. In some embodiments opening 284 is used to couple other structural elements to frame 330, depending on the specific design and structure that is being built. In some embodiments opening 284 is other shapes or sizes to accommodate connections to different structural elements or to other building panels, such as but not limited to building panels 112, 212, or 312. In this way building panel 312 includes opening 284, where opening 284 allows access to frame 330.

The specific embodiments of composite building panels 112, 212, and 312 and building panel structure 110 provided in this document should not be considered exhaustive. The disclosed parts and layers can be used interchangeably as needed to create desired structures and edifices according to the invention. Building panels of any size, thickness, shape, and strength can be created by interchanging the various components disclosed. It is to be understood that the cores and coatings and tracks described in this document can be used interchangeably to construct building panel structure 110 according to the invention.

Figure 28:
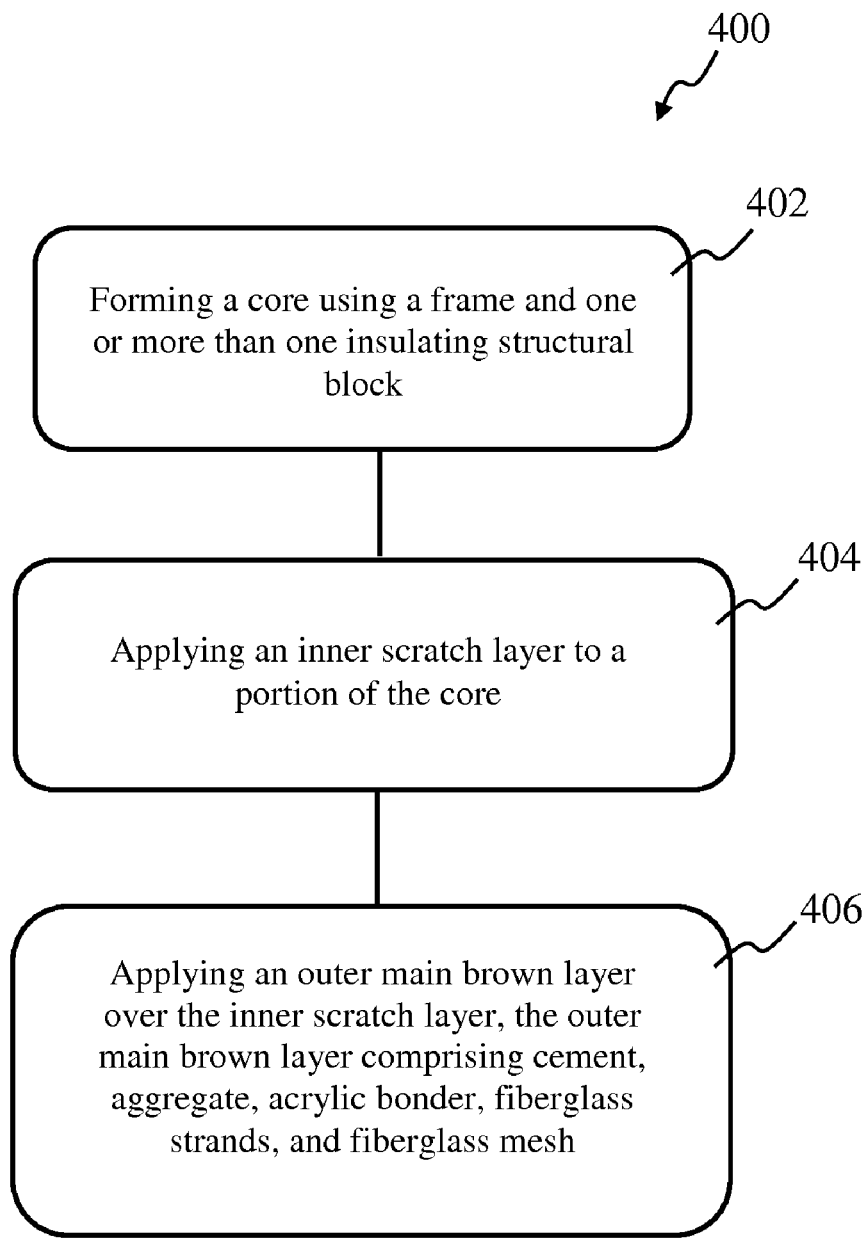
FIG. 28 illustrates method 400 of forming a building panel structure according to the invention.

FIG. 28 illustrates method 400 of forming a building panel structure according to the invention. Method 400 includes step 402 forming a core using a frame and one or more than one insulating structural block. Method 400 also includes step 404, applying an inner scratch layer to a portion of the core. Method 400 includes step 406, applying an outer main brown layer over the scratch layer, wherein the outer main brown layer includes cement, aggregate, acrylic bonder, fiberglass strands, and fiberglass mesh.

Method 400 can include many other steps. In some embodiments method 400 includes pouring a footer with an integral footer tongue, and coupling the core to the footer tongue, wherein the core includes a building panel groove. In some embodiments method 400 includes coupling a track to the core, where the track includes a rain drain channel. In some embodiments method 400 include interconnecting multiple building panels. In some embodiments method 400 includes interconnecting a building panel to a foundation using interconnect elements. In some embodiments interconnecting multiple building panels includes interconnecting multiple building panels by interconnecting the tracks of two or more building panels. In some embodiments interconnecting a building panel to a foundation includes interconnecting a building panel track to a foundation.

Step 402 forming a core using a frame and one or more than one insulating structural block can include many other steps. In some embodiments forming a core using a frame and one or more than one insulating structural block means embedding the frame within the one or more than one insulating structural block. In some embodiments the one or more than one block are composed of expanded polystyrene foam. In some embodiments step 402 includes cutting an insulating structural block to shape. In some embodiments step 402 include erecting structural members. In some embodiments step 402 includes stretching a wire mesh between two structural members. In some embodiments step 402 includes forming a structural element from galvanized steel. In some embodiments step 402 includes interconnecting a block and a frame using interconnect elements. In some embodiments step 402 includes coupling a C-channel to the tongue interconnect element of a block. In some embodiments step 402 includes cutting utility access routes into a frame or a block. In some embodiments step 402 include cutting control joint notches into a block.

Step 404 applying an inner scratch layer to a portion of the core can include many other steps. In some embodiments step 404 includes applying an acrylic modified cementitious membrane to the core. In some embodiments the scratch layer comprises two layers. In some embodiments the scratch layer includes a first scratch layer A and a second scratch layer B. In some embodiments applying an inner scratch layer to a portion of the core includes creating a first scratch layer A mixture comprising cement, aggregate, acrylic bonder, and water. In some embodiments applying an inner scratch layer to a portion of the core includes blowing the first scratch layer A mixture onto a portion of the core. In some embodiments applying an inner scratch layer to a portion of the core includes allowing the first scratch layer A mixture to cure. In some embodiments applying an inner scratch layer to a portion of the core includes creating a second scratch layer B brown mixture comprising cement, aggregate, acrylic bonder, fiberglass strands, and water. In some embodiments applying an inner scratch layer to a portion of the core includes trowelling the second scratch layer B brown mixture over the first scratch layer A. In some embodiments applying an inner scratch layer to a portion of the core includes embedding a fiberglass mesh in the second scratch layer B brown mixture while the second scratch layer B brown mixture is still wet. In some embodiments applying an inner scratch layer to a portion of the core includes allowing the second scratch layer B brown mixture to cure. In some embodiments the second scratch layer B brown mixture aggregate includes sand. In some embodiments the second scratch layer B brown mixture aggregate includes 20 grit sand and 30 grit sand. In some embodiments the second scratch layer B brown mixture aggregate includes perlite. In some embodiments the second scratch layer B brown mixture aggregate includes vermiculite. In some embodiments the inner scratch layer is 1/8" thick. In some embodiments applying an inner scratch layer includes embedding a wire mesh in the first scratch layer A. In some embodiments applying an inner scratch layer includes embedding a wire mesh in the second scratch layer B. In some embodiments the wire mesh is a 9 gage concrete wire mesh.

Step 406 applying an outer main brown layer over the inner scratch layer can include many other steps. In some embodiments step 406 includes applying a wire mesh over the inner scratch layer. In some embodiments applying an outer main brown layer over the inner scratch layer includes creating a main brown layer brown mixture comprising cement, aggregate, acrylic bonder, fiberglass strands, and water. In some embodiments applying an outer main brown layer over the inner scratch layer includes trowelling the main brown layer brown mixture over the inner scratch layer. In some embodiments applying an outer main brown layer over the inner scratch layer includes embedding a fiberglass mesh into the main brown layer brown mixture while the main brown layer brown mixture is still wet. In some embodiments applying an outer main brown layer over the inner scratch layer includes allowing the main brown layer brown mixture to cure. In some embodiments the main brown layer brown mixture aggregate includes sand. In some embodiments the main brown layer brown mixture aggregate includes two types of sand. In some embodiments the main brown layer brown mixture aggregate includes 20 grit sand and 30 grit sand. In some embodiments the main brown layer brown mixture aggregate includes perlite. In some embodiments the main brown layer brown mixture aggregate includes vermiculite. In some embodiments the main brown layer brown mixture includes other components. In some embodiments applying an outer main brown layer over the inner scratch layer includes trowelling the main brown layer over the scratch layer such that the outer main brown layer is 1/4" thick. In some embodiments applying an outer main brown layer over the inner scratch layer includes embedding a control joint reinforcement mesh in the main brown layer brown mixture over a control joint notch while the main brown layer brown mixture is still wet.

Figure 29:
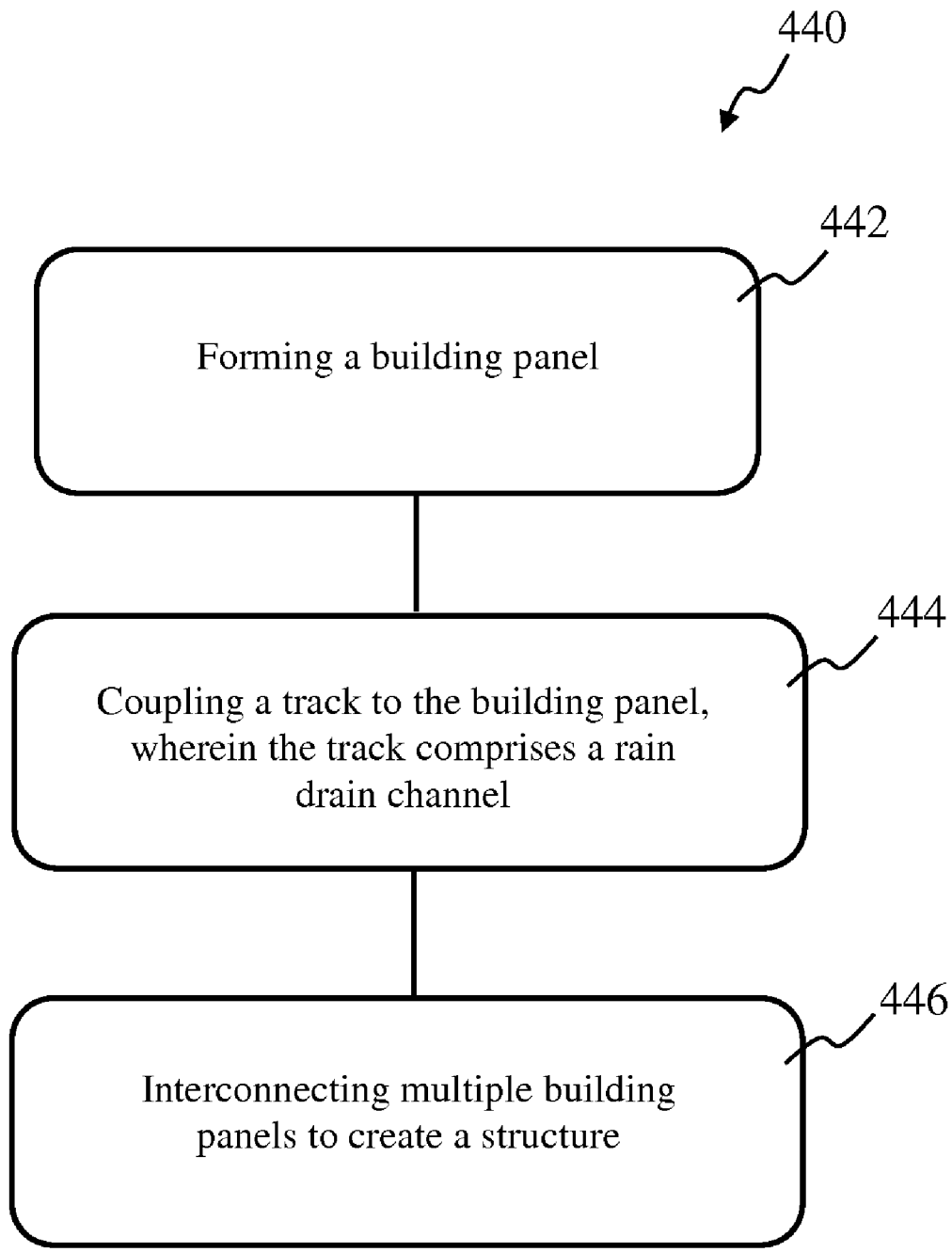
FIG. 29 illustrates method 440 of forming a structure according to the invention.

FIG. 29 illustrates a method 440 of forming a structure which includes step 442 forming a building panel, step 444 coupling a track to the building panel, wherein the track comprises a rain drain channel, and step 446 interconnecting multiple building panels to create a structure.

Method 440 can include many other steps. In some embodiments method 440 includes coupling a building panel with a track to a footer.

Step 442 forming a building panel can include many other steps. In some embodiments step 442 forming a building panel includes forming a core with a frame and one or more than one insulating structural block, and applying a coating to a portion of the core. In some embodiments applying a coating to a portion of the core includes applying a main brown layer to a portion of the core, where the main brown layer is composed of cement, aggregate, acrylic bonder, and fiberglass strands. In some embodiments applying a coating to a portion of the core includes embedding a fiberglass mesh in the main brown layer while the main brown layer is still wet. In some embodiments the main brown layer includes a wire mesh. In some embodiments applying a coating to a portion of the core includes applying a scratch layer to a portion of the core. In some embodiments the scratch layer includes a wire mesh. In some embodiments the scratch layer includes two layers. In some embodiments applying a scratch layer to a portion of the core includes applying a first scratch layer A to a portion of the core. In some embodiments the first scratch layer A is blown onto the core. In some embodiments the first scratch layer A includes cement, aggregate, and acrylic bonder. In some embodiments applying a scratch layer to a portion of the core includes applying a second scratch layer B over the first scratch layer A. In some embodiments the second scratch layer B includes cement, aggregate, acrylic bonder, and fiberglass strands. In some embodiments the second scratch layer B further includes a fiberglass mesh. In some embodiments the fiberglass mesh is embedded in the second scratch layer B while the second scratch layer B is still wet.

Step 444 coupling a track to the building panel can include many other steps. In some embodiments coupling a track to the building panel includes coupling a first and a second opposing arm of the track to a core. In some embodiments the first and second opposing arm of the core frictionably engages a front surface and a rear surface, respectively, of the core. In some embodiments of step 444 the track includes a seal spacer channel. In some embodiments of step 444 the track includes a screed boundary.

Step 446 interconnecting multiple building panels to create a structure can include many other steps. In some embodiments step 446 includes coupling the track of a first building panel to the track of a second building panel. In some embodiments step 446 includes coupling a building panel to a footer. In some embodiments step 446 includes coupling a building panel groove to a footer tongue. In some embodiments step 446 includes coupling a building panel to a floor using an opening in the building panel, wherein the opening allows access to a frame element. In some embodiments of step 446 building panels are interconnected to form walls. In some embodiments building panels are interconnected to form roofs. In some embodiments building panels are interconnected such that water is directed through rain drain channels to exit the structure. In some embodiments building panels are interconnected such that a core is connected to a foundation. In some embodiments building panels are interconnected such that a core is connected to a footer.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A building panel comprising:
   a core having a front surface, a rear surface, and side surfaces; and
   a coating covering at least a portion of the front or rear surfaces, wherein the coating comprises:

an inner scratch layer, wherein the inner scratch layer consists of at least two layers, the layers comprising:
a first scratch layer A consisting essentially of cement, aggregate, and acrylic bonder; and
a second scratch layer B comprising cement, aggregate, acrylic bonder, fiberglass strands, and fiberglass mesh; and
an outer main brown layer, the outer main brown layer further comprising cement, aggregate, acrylic bonder, fiberglass strands, and fiberglass mesh.

2. The building panel of claim 1 wherein the inner scratch layer comprises a wire mesh.

3. The building panel of claim 1 wherein the outer main brown layer aggregate comprises perlite.

4. The building panel of claim 1 wherein the outer main brown layer aggregate comprises sand.

5. The building panel of claim 1 wherein the core comprises:
a frame; and
one or more than one insulating structural block coupled to the frame.

6. The building panel of claim 5, wherein the insulating structural block is composed of expanded polystyrene foam.

7. The building panel of claim 5, wherein the frame is embedded in the one or more than one insulating structural block.

* * * * *